(12) United States Patent
Kobayashi et al.

(10) Patent No.: US 9,596,402 B2
(45) Date of Patent: Mar. 14, 2017

(54) MICROLENS ARRAY FOR SOLID-STATE IMAGE SENSING DEVICE, SOLID-STATE IMAGE SENSING DEVICE, IMAGING DEVICE, AND LENS UNIT

(71) Applicant: Kabushiki Kaisha Toshiba, Minato-ku (JP)

(72) Inventors: Mitsuyoshi Kobayashi, Ota (JP); Risako Ueno, Meguro (JP); Kazuhiro Suzuki, Minato (JP); Hiroto Honda, Yokohama (JP); Honam Kwon, Kawasaki (JP); Hideyuki Funaki, Shinagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 68 days.

(21) Appl. No.: 14/481,999

(22) Filed: Sep. 10, 2014

(65) Prior Publication Data

US 2015/0077585 A1  Mar. 19, 2015

(30) Foreign Application Priority Data

Sep. 19, 2013 (JP) ................. 2013-194666
Sep. 5, 2014 (JP) ................. 2014-181543

(51) Int. Cl.
 *H04N 5/232* (2006.01)
 *H04N 5/225* (2006.01)
 *G02B 3/00* (2006.01)

(52) U.S. Cl.
 CPC ....... *H04N 5/23212* (2013.01); *G02B 3/0037* (2013.01); *H04N 5/2257* (2013.01)

(58) Field of Classification Search
 None
 See application file for complete search history.

(56) References Cited

U.S. PATENT DOCUMENTS

| 2009/0122175 A1* | 5/2009 | Yamagata | G02B 3/0043 348/335 |
| 2010/0194921 A1 | 8/2010 | Yoshioka | |
| 2012/0050562 A1 | 3/2012 | Perwass et al. | |
| 2012/0229683 A1* | 9/2012 | Kobayashi | H04N 5/232 348/246 |

FOREIGN PATENT DOCUMENTS

JP  2012-205014 A  10/2012

OTHER PUBLICATIONS

T. Georgiev, et al., "Reducing Plenoptic Camera Artifacts", Computer Graphics forum, vol. 29, No. 6, (2010), pp. 1955-1968.

* cited by examiner

*Primary Examiner* — Mark T Monk
(74) *Attorney, Agent, or Firm* — Oblon, McClelland, Maier & Neustadt, L.L.P.

(57) ABSTRACT

According to an embodiment, a microlens array for a solid-state image sensing device includes a plurality of microlenses and a state detector. The plurality of microlenses are disposed in an imaging microlens area and is configured to form two-dimensional images. The state detector is disposed on a periphery of the imaging microlens area and is configured to, on an image forming surface of the microlenses, generate images having a smaller diameter than images formed by the microlenses.

7 Claims, 23 Drawing Sheets

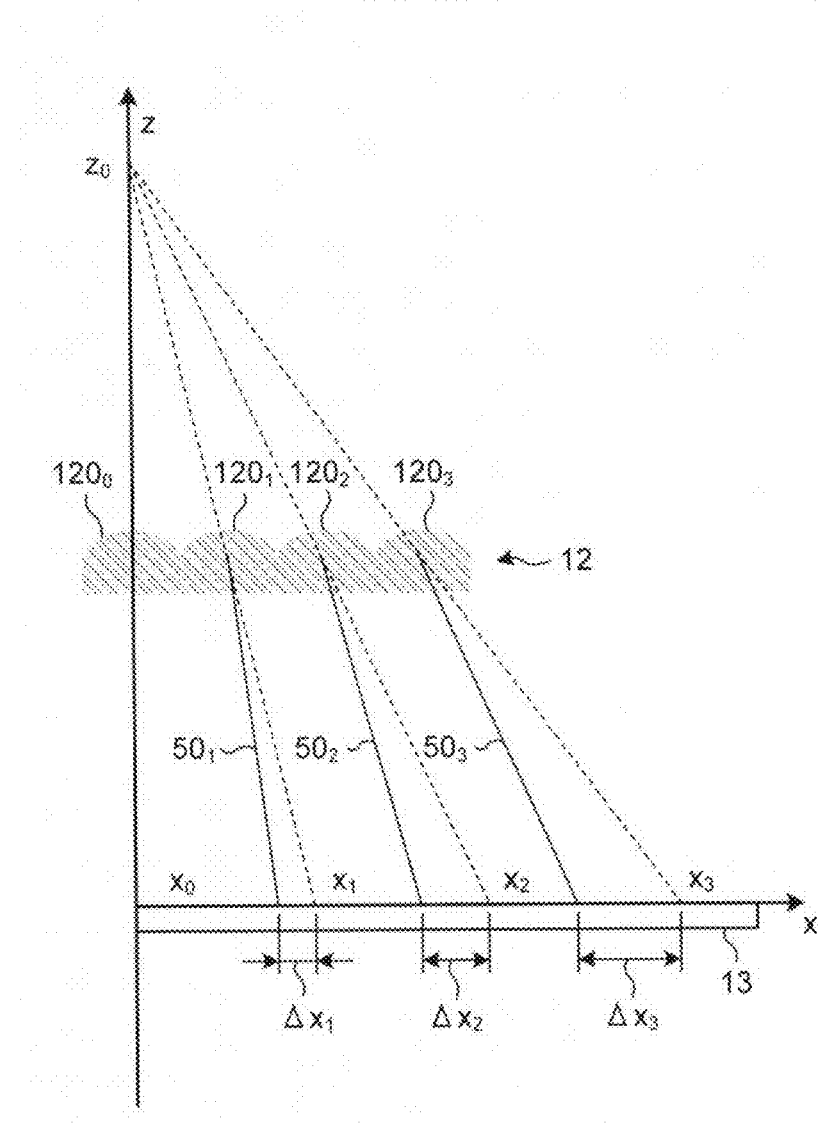

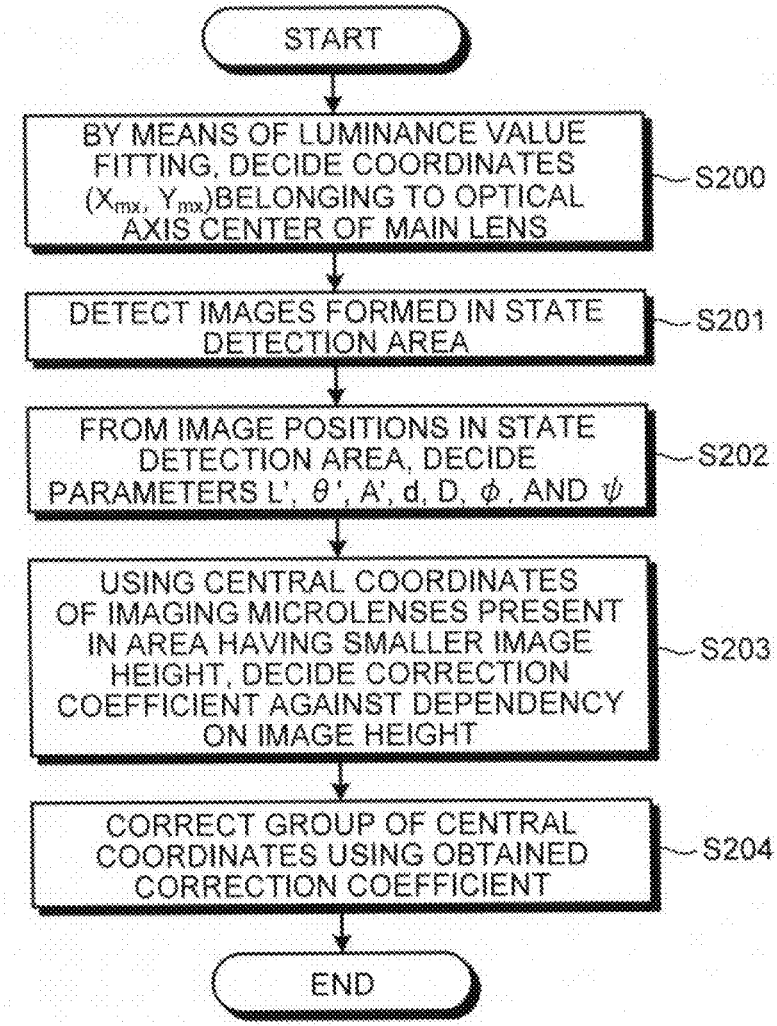

MICROLENS ARRAY FOR SOLID-STATE IMAGE SENSING DEVICE, SOLID-STATE IMAGE SENSING DEVICE, IMAGING DEVICE, AND LENS UNIT

CROSS-REFERENCE TO RELATED APPLICATIONS

This application is based upon and claims the benefit of priority from Japanese Patent Application No. 2013-194666, filed on Sep. 19, 2013; and Japanese Patent Application No. 2014-181543, filed on Sep. 5, 2014; the entire contents of which are incorporated herein by reference.

FIELD

Embodiments described herein relate generally to a microlens array for a solid-state image sensing device; a solid-state image sensing device; an imaging device; and a lens unit.

BACKGROUND

Regarding an imaging optical system, a structure has been proposed in which a microlens array is disposed on the upper side of pixels; a plurality of pixels is arranged in the lower part of each microlens; and an image from a main lens is further formed on the pixels using the microlens array. In this structure, a group of images having parallaxes can be obtained in the units of pixel blocks. The parallaxes enable performing a refocussing operation based on distance estimation and distance information of a photographic subject. An optical configuration in which an image from a main lens is further formed using a microlens array is called a refocus optical system.

In a configuration in which the refocus optical system is used, the image formed due to each microlens is an image taken by shifting the position of the same photographic subject captured by the adjacent image. Hence, if the images formed due to the microlenses are superimposed, it becomes possible to reconstruct a refocused image focused at an arbitrary specified distance in the image.

In such a refocus optical system, it is important that the central coordinates of the microlens have high accuracy because the image processing superimposes the microlens images with each other by shifting them. Therefore, the central coordinates having a large error may cause the resolution and distance accuracy in the reconstructed image to be reduced.

BRIEF DESCRIPTION OF THE DRAWINGS

FIG. 24 is a diagram for explaining about the action of the optical refraction in a microlens array substrate according to a second embodiment; and FIG. 25 is a flowchart for explaining an example of the operation of generating a group of central coordinates of microlens images according to the second embodiment.

DETAILED DESCRIPTION

According to an embodiment, a microlens array for a solid-state image sensing device includes a plurality of microlenses and a state detector. The plurality of microlenses are disposed in an imaging microlens area and is configured to form two-dimensional images. The state detector is disposed on a periphery of the imaging microlens area and is configured to, on an image forming surface of the microlenses, generate images having a smaller diameter than images formed by the microlenses.

Exemplary embodiments of a microlens array for a solid-state image sensing device, a solid-state image sensing device, and an imaging device are described below.

First Embodiment

Figure 1:
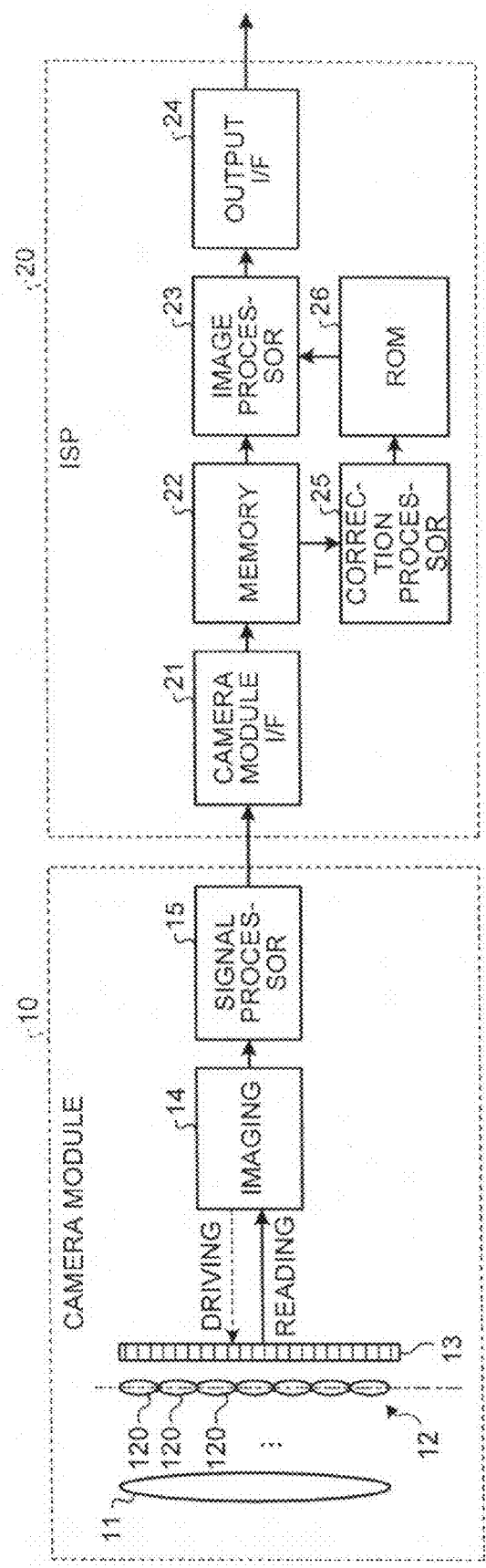
FIG. 1 is a block diagram illustrating an exemplary configuration of an imaging device that can be implemented in a first embodiment.

In FIG. 1 is illustrated an exemplary configuration of an imaging device that can be implemented in a first embodiment. With reference to FIG. 1, an imaging device 1 includes a camera module 10 functioning as a lens unit and includes an image signal processor (ISP) 20.

The camera module 10 includes an imaging optical system having a main lens 11; a solid-state image sensing device having a microlens array 12 and an image sensor 13; an imager 14; and a signal processor 15. The imaging optical system includes one or more lenses, and guides the light coming from a photographic subject to the microlens array 12 and the image sensor 13. If the imaging optical system includes a plurality of lenses, a virtual lens corresponding to a combination of the plurality of lenses may be used as the main lens 11. Specifically, in an optical system including two or more lenses, the focal distance of the whole optical system has a value reflecting the refraction of all the lenses. This value is referred to as a "composite focal distance". For example, in two lenses having focal distances $f_1$ and $f_2$, respectively, the composite focal distance f is represented by $1/f=(1/f_1)+(1/f_2)-(d/(f_1 \times f_2))$ where d indicates the distance between the two lenses. In this way, an optical system including a plurality of lenses can be replaced with a single virtual lens. In the following description, if the imaging optical system includes one lens, the one lens corresponds to the main lens 11; if the imaging optical system includes two or more lenses, the virtual lens as described above corresponds to the main lens 11.

As far as the image sensor 13 is concerned; for example, a charge coupled device (CCD) or a complementary metal oxide semiconductor (CMOS) imager is used. Moreover, the image sensor 13 includes a pixel array of a plurality of pixels, each of which converts the received light into an electrical signal by means of photoelectric conversion and outputs the electrical signal.

The microlens array 12 includes a plurality of microlenses 120 arranged according to predetermined rules. In the microlens array 12, the area in which the microlenses 120 are disposed is called an imaging microlens area. Regarding a group of light beams that result in the formation of an image on an image forming surface due to the main lens 11, the microlens array 12 re-forms the image in a reduced manner in pixel blocks each of which includes a plurality of pixels on the image sensor 13 that correspond to one of the microlenses 120.

Although described later in detail, in the first embodiment, the microlens array 12 includes a state detector that is disposed on the periphery of the microlens area, in which the microlenses 120 are detected, and that is used in detecting the state of the microlens array 12. In the first embodiment, based on the information obtained by the state detector, correction is performed with respect to the central coordinates of each microlens image that is taken at the image sensor 13 due to the light coming from each microlens 120.

Meanwhile, the camera module 10 can be configured in such a way that, for example, the imaging optical system including the main lens 11 is separated from the other portion, thereby making it possible to replace the main lens 11. However, that is not the only possible case. Alternatively, the camera module 10 can be configured as a unit in which the imaging optical system, which includes the main lens 11, and the microlens array 12 are housed in a single housing. In that case, the entire unit including the imaging optical system and the microlens array 12 becomes replaceable.

The imager 14 includes a driver circuit for driving each pixel of the image sensor 13. The driver circuit includes, for example, a vertical selection circuit for sequentially selecting the pixels to be driven in the vertical direction in the units of horizontal lines (rows); a horizontal selection circuit for sequentially selecting the pixels to be driven in the vertical direction in the units of columns; and a timing generator that drives the vertical selection circuit and the horizontal selection circuit at various pulses. Then, the imager 14 reads, from the pixels selected by the vertical selection circuit and the horizontal selection circuit, the electrical charge obtained by means of photoelectrical conversion of the received light; converts the electrical charge into electrical signals; and outputs the electrical signals.

With respect to the analog electrical signals output from the imager 14; the signal processor 15 performs gain adjustment, noise removal, and amplification. Moreover, the signal processor 15 includes an A/D conversion circuit for converting the processed signals into digital signals and outputting them as image signals of a RAW image.

The ISP 20 includes a camera module I/F 21, a memory 22, an image processor 23, an output I/F 24, a correction processor 25, and a read only memory (ROM) 26. The camera module I/F 21 is an interface for signals with respect to the camera module 10. The image signals of a RAW image (hereinafter, called a RAW image) that are output from the signal processor 15 of the camera module 10 are stored in, for example, the memory 22, which is a frame memory, via the camera module I/F 21.

From among the RAW images stored in the memory 22, based on the RAW images which are formed on the basis of the light coming from each microlens disposed in the imaging microlens area of the microlens array 12; the image processor 23 enlarges the image of the area corresponding to each microlens, performs a refocussing operation in which the images are superimposed while shifting positions thereof, and obtains a refocused image that has been reconstructed. Then, the refocused image is output from the output I/F 24 and is either displayed on a display device (not illustrated) or stored in an external memory medium.

Meanwhile, instead of storing the RAW images in the memory 22, they can be stored in an external memory medium. In that case, a RAW image read from the external memory medium is stored in the memory 22 via, for example, the camera module I/F 21. Then, the image processor 23 performs the refocussing operation with respect to that image. Thus, it becomes possible to obtain a refocused image at a desired timing.

Based on the RAW image stored in the memory 22, the correction processor 25 calculates a correction coefficient that is to be used in correcting the center position of each microlens image formed due to each microlens 120 in the microlens array 12. For example, the correction processor 25 calculates the correction coefficient based on the images that are included in the RAW image and that are formed by the light coming from the state detector of the microlens array 12. Besides, the correction processor 25 can calculate the correction coefficient by further referring to the RAW images formed on the basis of the light coming from each microlens disposed in the imaging microlens area of the microlens array 12.

Then, using the calculated correction coefficient, the correction processor 25 corrects the coordinates of the center position of the image formed by each microlens 120, and stores the group of corrected center position coordinates in the ROM 26. Then, the image processor 23 performs the refocussing operation using the group of corrected center position coordinates that is stored in the ROM 26.

Optical System Implementable in First Embodiment

Figure 2:
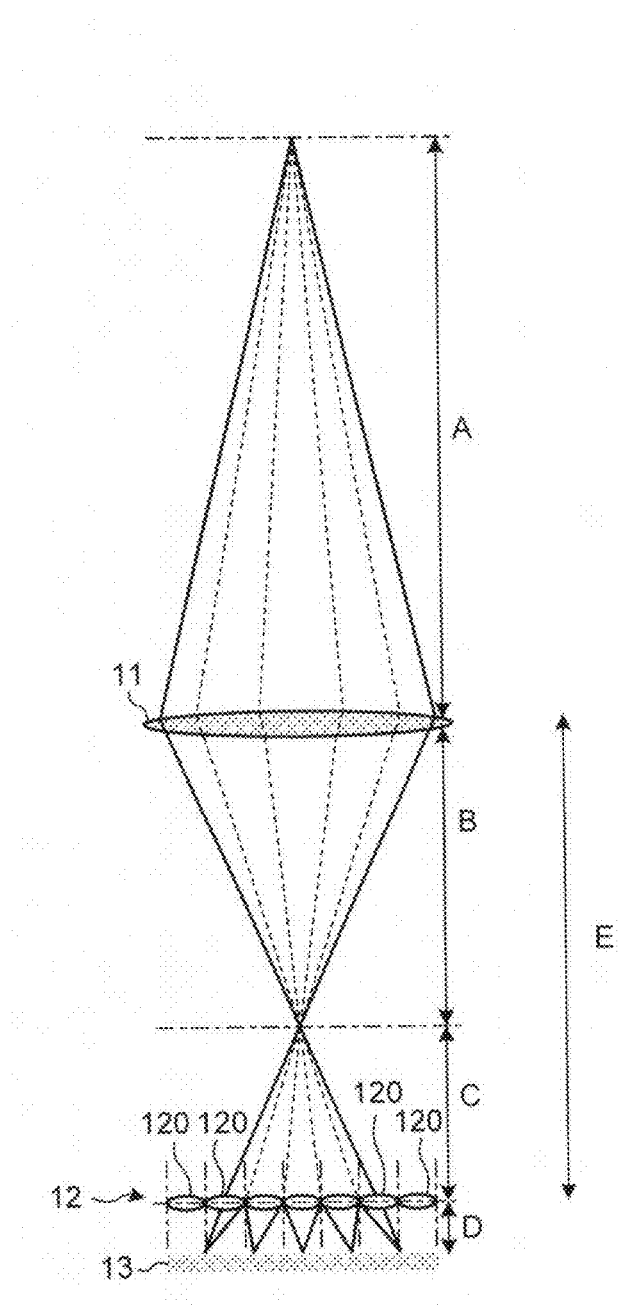
FIG. 2 is a diagram illustrating an exemplary configuration of an optical system that can be implemented in the first embodiment.

Given below is the explanation of an optical system that can be implemented in the first embodiment. Herein, the optical system includes the main lens 11, the microlens array 12, and the image sensor 13. In FIG. 2 is illustrated an exemplary configuration of the optical system that can be implemented in the first embodiment. With reference to FIG. 2, a distance A indicates the distance between the main lens 11 and a photographic subject; and a distance B indicates the image forming distance for the main lens 11. Moreover, a distance C indicates the shortest distance between the image forming surface of the main lens 11 and the microlenses 120 of the microlens array 12; and a distance D indicates the distance between the microlens array 12 and the image sensor 13. Meanwhile, the main lens 11 has a focal distance f, and each microlens 120 has a focal length g. Herein, for the purpose of illustration, with respect to the optical axis, the side of the photographic subject is defined as the front side and the side of the image sensor 13 is defined as the backside.

In the optical system, using the light beams coming from the main lens 11, the microlenses 120 disposed in the microlens array 12 form images of all viewpoints on the image sensor 13.

Figure 3:
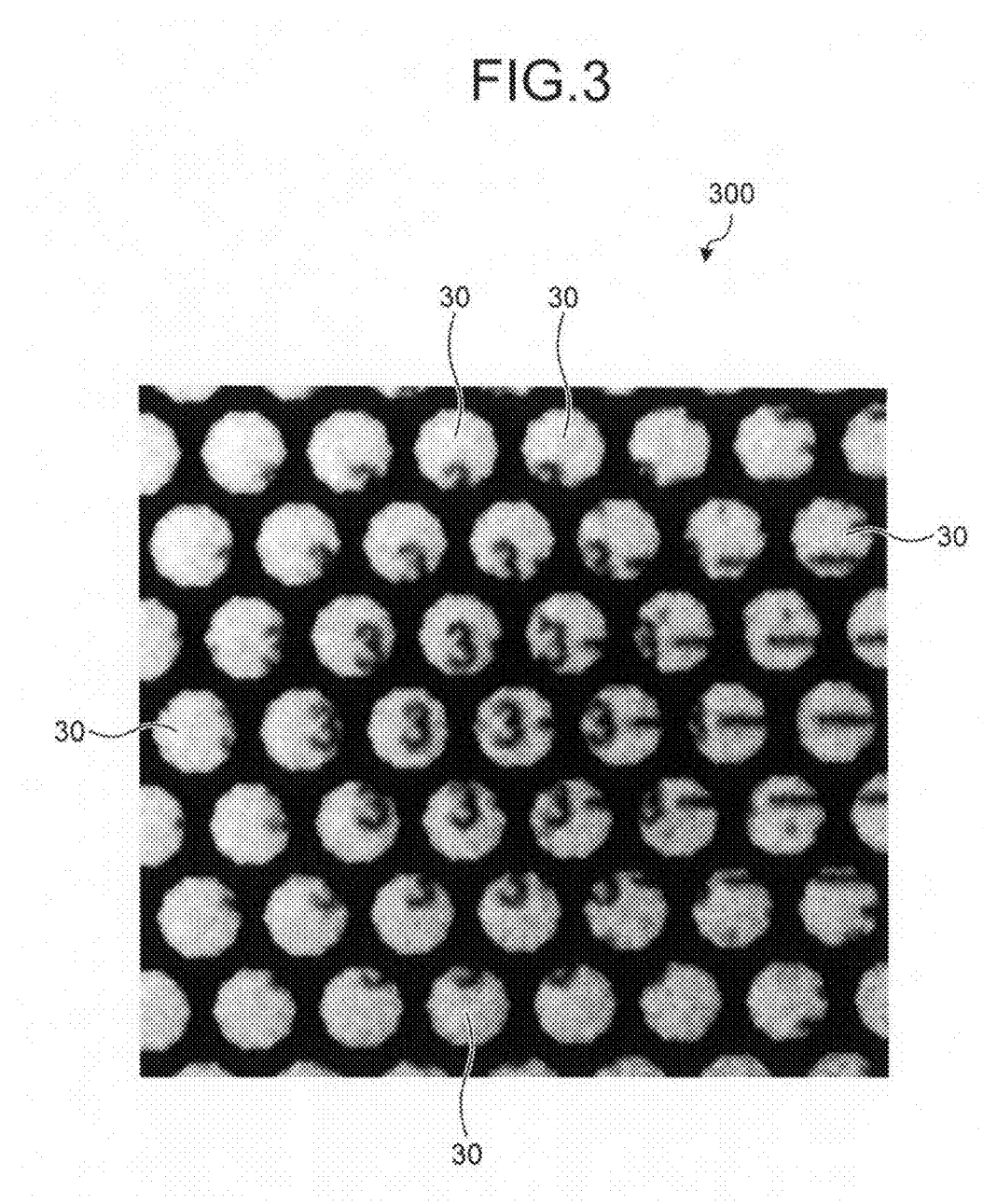
FIG. 3 is a diagram that schematically illustrates an example of a RAW image according to the first embodiment.

In FIG. 3 is schematically illustrated an example according to the first embodiment of a RAW image based on the output of the image sensor 13 in the case in which the image forming surface of the main lens 11 is positioned on the backside of the image sensor 13. The signal processor 15 outputs an image $30_0$ as the RAW image in which microlens images 30, which are formed on the light receiving surface of the image sensor 13 due to the microlenses 120 of the microlens array 12, are arranged in a corresponding manner to the arrangement of the microlenses 120. With reference to FIG. 3, according to the arrangement of the microlenses 120, the same photographic subject (for example, the number "3") is captured with a predetermined shift in each microlens image 30.

Herein, it is desirable that the microlens images 30 formed on the image sensor 13 due to the microlenses 120 are formed without any mutual overlapping. Moreover, with reference to FIG. 3, the microlenses 120 are arranged on hexagonal lattice points. However, the arrangement of the microlenses 120 is not limited to this example, and it is possible to have some other arrangement. For example, the microlenses 120 can be arranged on square lattice points.

Figure 4:
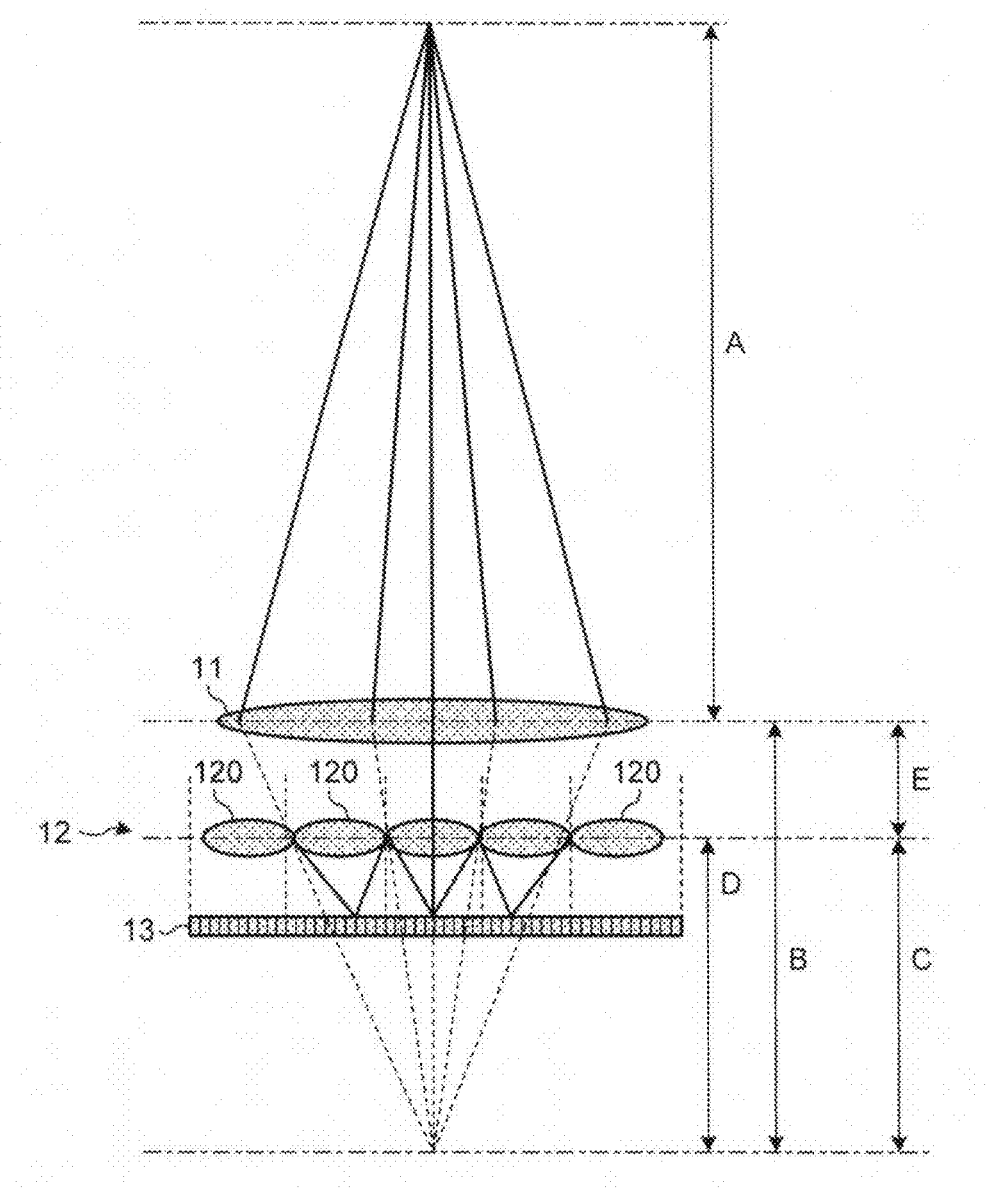
FIG. 4 is a diagram illustrating another exemplary configuration of the optical system that can be implemented in the first embodiment.

Meanwhile, in the example illustrated in FIG. 2, the microlens array 12 is disposed on the backside of the image forming surface of the main lens 11. However, that is not the only possible case. Alternatively, for example, as illustrated in FIG. 4, the microlens array 12 can be disposed on the front side of the image forming surface of the main lens 11. In the following explanation, it is assumed that the microlens array 12 is disposed on the backside of the image forming surface of the main lens 11 as illustrated in FIG. 2.

Explained below with reference to FIG. 2 is the principle of creating a refocused image. With reference to FIG. 2, addition of the distance B and the distance C is treated as a distance E. If the position of the main lens 11 is fixed, then the distance is a constant number. Herein, the explanation is given under the assumption that the distance E and the distance D are constant numbers.

In the main lens 11, a relationship given below in Equation (1) according to the lens formula is established between the distance A to the photographic subject, the distance B at which an image is formed by the light coming from the photographic subject, and the focal length f. In an identical manner, regarding the microlenses 120 of the microlens array 12 too, a relationship given below in Equation (2) according to the lens formula is established.

$$\frac{1}{A} + \frac{1}{B} = \frac{1}{f} \qquad (1)$$

$$\frac{1}{C} + \frac{1}{D} = \frac{1}{g} \qquad (2)$$

When there is a change in the distance A between the main lens 11 and the photographic subject, the value of the distance B in the lens formula given in Equation (1) undergoes a change. Based on the positional relationship in the optical system, addition of the distance B and the distance C is equal to the distance E as described above. Moreover, the distance E is fixed. Hence, along with the change in the distance B, the value of the distance C also undergoes a change. Regarding the microlenses 120, as a result of using the lens formula given in Equation (2), along with the change in the distance C, it is found that the value of the distance D also undergoes a change.

Hence, as far as the image formed due to each microlens 120 is concerned, it becomes possible to obtain an image that is the result of reducing the image forming surface, which is a virtual image of the main lens 11, by a magnification N (where, N=D/C). The magnification N can be expressed as Equation (3) given below.

$$N = \frac{D}{C} = \frac{D}{E-B} = \frac{\frac{Cg}{C-g}}{E - \frac{Af}{A-f}} = \frac{Cg(A-f)}{(C-g)\{E(A-f) - Af\}} \qquad (3)$$

Figure 5:
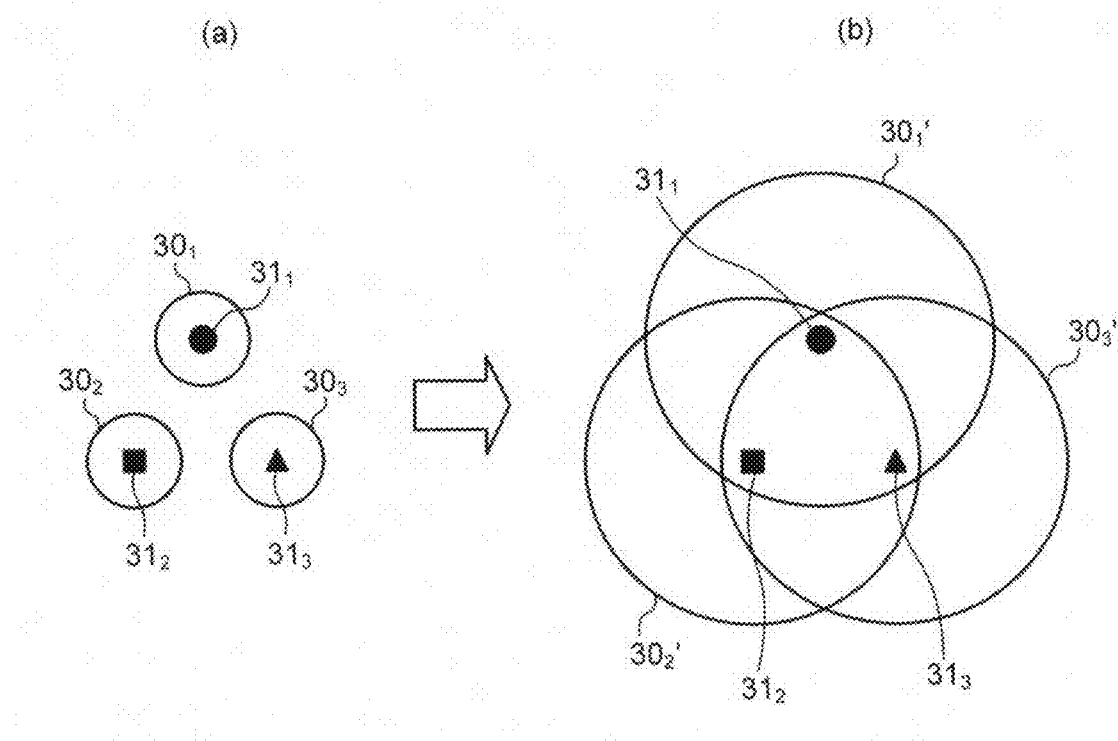
FIG. 5 is a diagram for explaining a refocusing operation performed according to the first embodiment.

According to Equation (3), it is found that the reduction ratio of the images formed on the image sensor 13 due to the microlenses 120 is dependent on the distance A from the main lens 11 to the photographic subject. Hence, in order to reconstruct the original two-dimensional image; for example, microlens images $30_1$, $30_2$, and $30_3$ that are formed due to the microlenses 120 and that have points $31_1$, $31_2$, and $31_3$ as the respective central coordinates as illustrated in (a) in FIG. 5 are enlarged with the magnification of 1/N as illustrated in (b) in FIG. 5, thereby resulting in the generation of enlarged microlens images $30_1'$, $30_2'$, and $30_3'$, respectively. Then, superimposition and synthesizing of the enlarged microlens images $30_1'$, $30_2'$, and $30_3'$ is performed so that it becomes possible to obtain a reconstructed image that is in focus with the distance A.

During superimposition, regarding the portion other than in the direction A, the enlarged microlens images $30_1'$, $30_2'$, and $30_3'$ get superimposed in a misaligned manner. As a result, it becomes possible to achieve a blurring-like effect.

Thus, the refocussing operation points to an operation in which an arbitrary position is brought into focus from such microlens images.

As illustrated in FIG. 5, during the process in which a RAW image, which is formed by capturing images from the microlens array 12, is reconstructed by implementing the refocussing operation so as to obtain a two-dimensional image; for example, the microlens images $30_1$, $30_2$, and $30_3$ are enlarged with reference to the coordinates of the respective center points $31_1$, $31_2$, and $31_3$. For that reason, for example, the accuracy of the coordinates of the center points $31_1$, $31_2$, and $31_3$ assumes significance.

Figure 6:
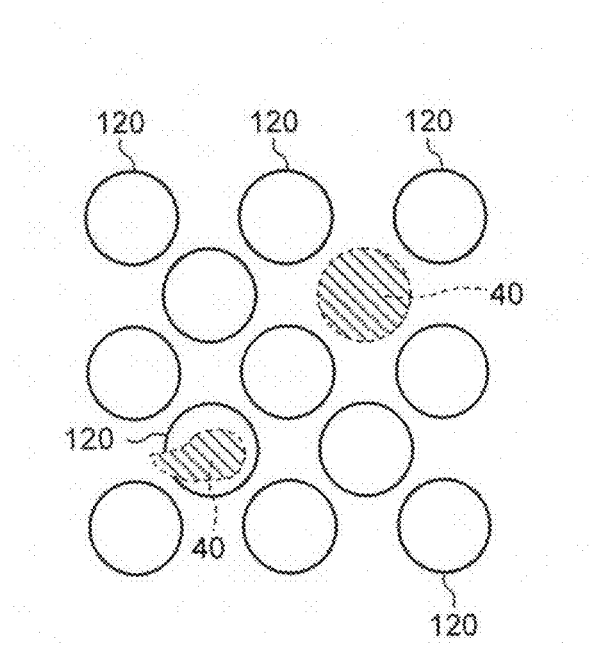
FIGS. 6 and 7 are diagrams for explaining deterioration in the image quality of microlens images according to the first embodiment.

As far as the method of detecting the central coordinates of each microlens image 30 is concerned, it is possible to extract the microlens images 30 from the RAW image, which is taken using the image sensor 13, by means of image matching; and to obtain the central coordinates of each extracted microlens image 30. In this method of implementing image matching, an error may occur in the detected central coordinates depending on the image quality of the microlens images 30. For example, as illustrated in FIG. 6, if any abnormality 40 such as a scratch, dirt, or dust is present on any microlens 120, then the microlens image 30 formed due to that microlenses 120 becomes blurred or gets distorted. In such a case, it becomes difficult to perform image matching with respect to the microlens image 30 of that microlens 120, and there occurs an increase in the detection error of the central coordinates that are obtained as the result of image matching.

Figure 7:
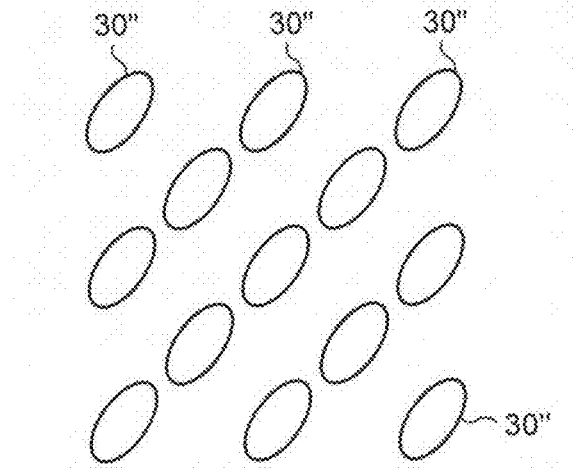

Moreover, in the microlens array 12, in the area that is distant from the optical axis of the main lens 11 and that has a greater image height, there is a possibility that the microlens images 30 themselves get distorted as illustrated in FIG. 7 due to the effect of vignetting. For that reason, the detected positions of the central coordinates of distorted microlens images 30", which are distorted due to the effect of vignetting, become misaligned to the central positions of the microlenses 120 as per the design. That leads to the possibility of an increased detection error. Moreover, in the area having a greater image height, the angle of incidence of the light coming from the main lens 11 and falling on the microlens array 12 increases as compared to the area having a smaller image height. Hence, the area having a greater image height becomes vulnerable to the effect of the refractive index of the base of the microlens array 12.

In order to avoid such factors causing an increase in the error in the central coordinates of the microlens images 30; in the first embodiment, the state detector that detects the state of the microlens array 12 is disposed on the periphery of the microlens array 12. Then, based on the information that can be obtained using the state detector, the central coordinates of each microlens image 30 is generated.

Figure 8:
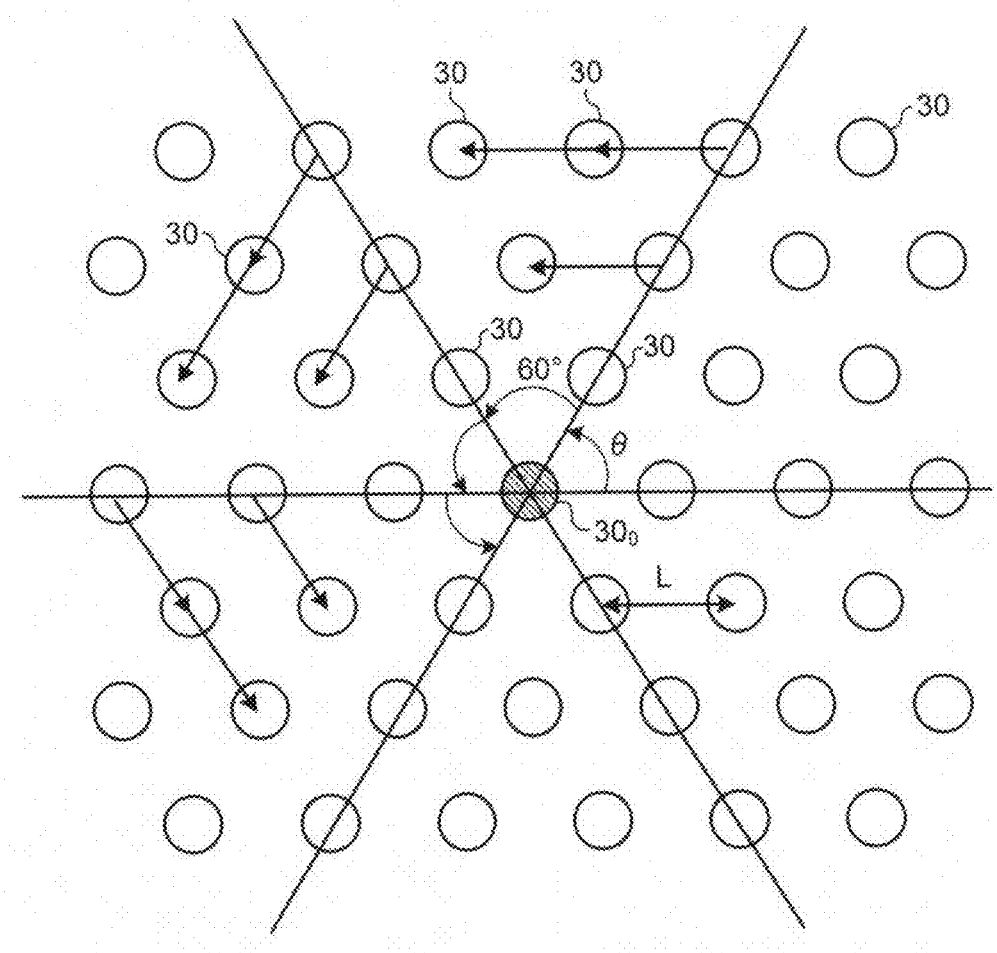
FIG. 8 is a diagram for explaining about the central coordinates of each microlens image.

Given below is the explanation with reference to FIG. 8 about the central coordinates of the microlens images 30. Herein, in the microlens array 12, it is assumed that the microlenses 120 are arranged on hexagonal lattice points. In this case, the arrangement of the microlens images 30 formed due to the microlenses 120 is such that, for example, the microlens images 30 are disposed in a cyclic fashion on hexagonal lattice points with reference to a microlens image $30_0$ at the center of the microlens array 12.

The parameters related to the arrangement of the microlens images 30 at least include the central coordinates of the reference microlens image $30_0$, a distance L between the central coordinates of the adjacent microlens images 30, and an initial-arrangement angle θ. When the microlenses 120 are disposed on hexagonal lattice points, the initial-arrangement angle θ is, for example, as follows. In three mutually adjacent microlens images 30 including a particular microlens image 30, the angle of view from the central coordinates of the particular microlens image 30 (for example, from a point P) to the central coordinates of the other two microlens images (for example, to points Q and R) is the initial-arrangement angle θ. That is, the angle ∠QPR is the initial-arrangement angle θ.

Consider the case of an ideal model in an ideal state in which the refractive index of the microlens array substrate (described later) constituting the microlens array 12 is not taken into account and the tilt of the microlens array 12 with respect to the light receiving surface of the image sensor 13 is not taken into account. In this case, the central coordinates of the microlens images 30 formed on the microlens array 12 can be calculated using the above-mentioned parameters (the central coordinates of the reference microlens image $30_0$, the distance L, and the initial-arrangement angle θ).

Meanwhile, there are times when the microlens array 12 is tilted with respect to the light receiving surface of the image sensor 13 due to an error during manufacturing. In such a case, in order to accurately obtain the central coordinates of the microlens images 30 formed in a RAW image, correction corresponding to the tilt of the microlens array 12 needs to be performed with respect to the central coordinates of the microlens images 30 that are obtained based on the ideal model.

Figure 9:
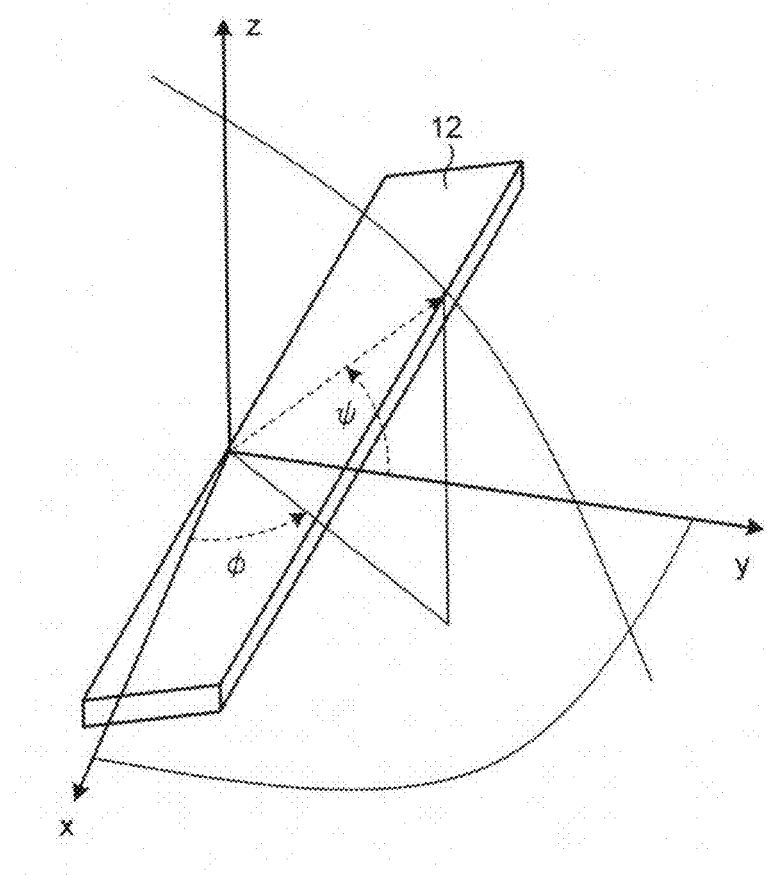
FIG. 9 is a diagram for explaining about the tilt of a microlens array according to the first embodiment.

Given below is the explanation with reference to FIG. 9 about the tilt of the microlens array 12. In a three-dimensional space represented by xyz axes as illustrated in FIG. 9, the xy plane is assumed to correspond to the light receiving surface of the image sensor 13. In this case, the tilt of the microlens array 12 can be written using an angle φ representing the rotation in the xy plane and an angle ϕ representing the rotation in the z-axis direction.

Figure 10:
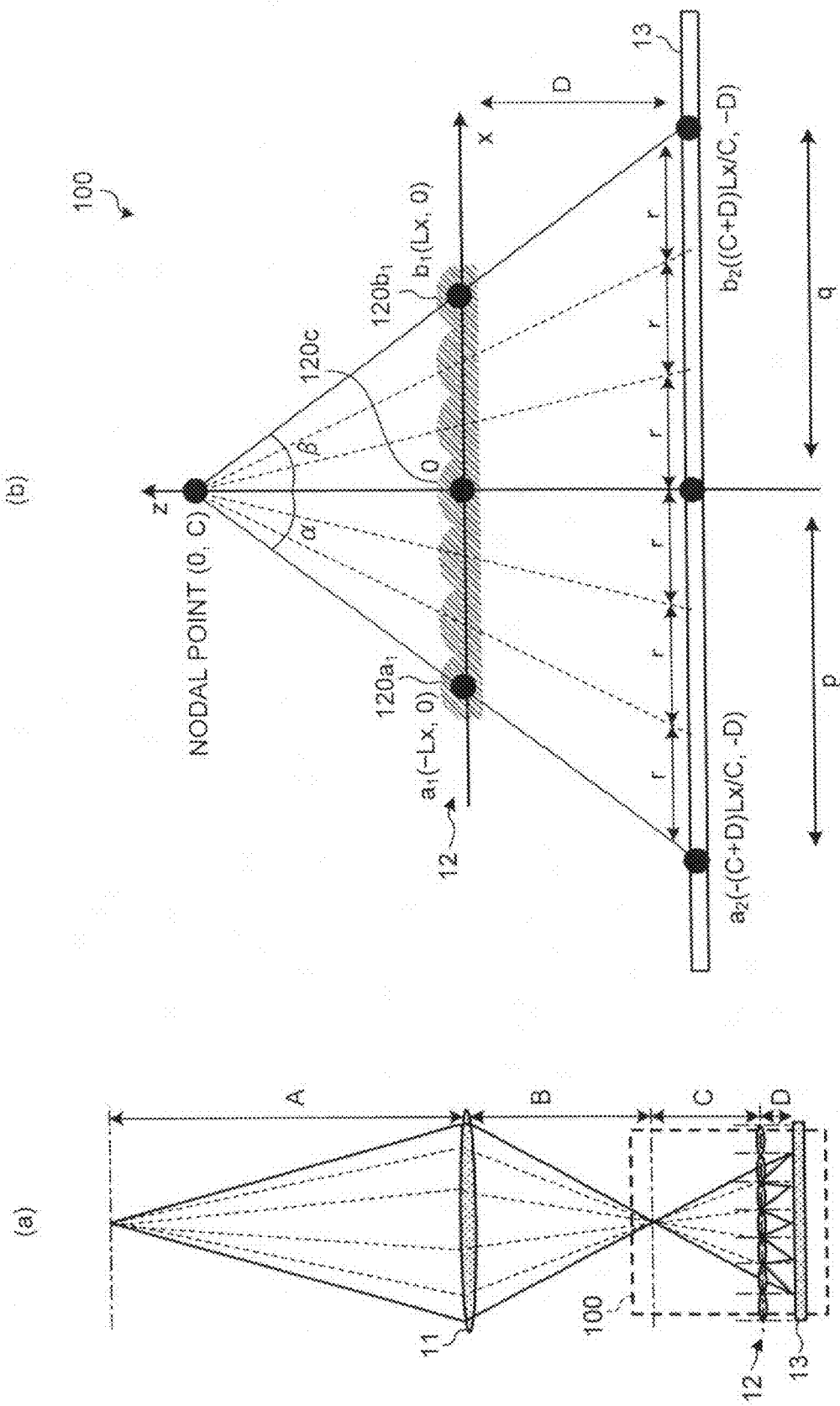
FIG. 10 is a diagram illustrating an example, according to the first embodiment, of central coordinates in the case in which the microlens array is not tilted.
Figure 11:
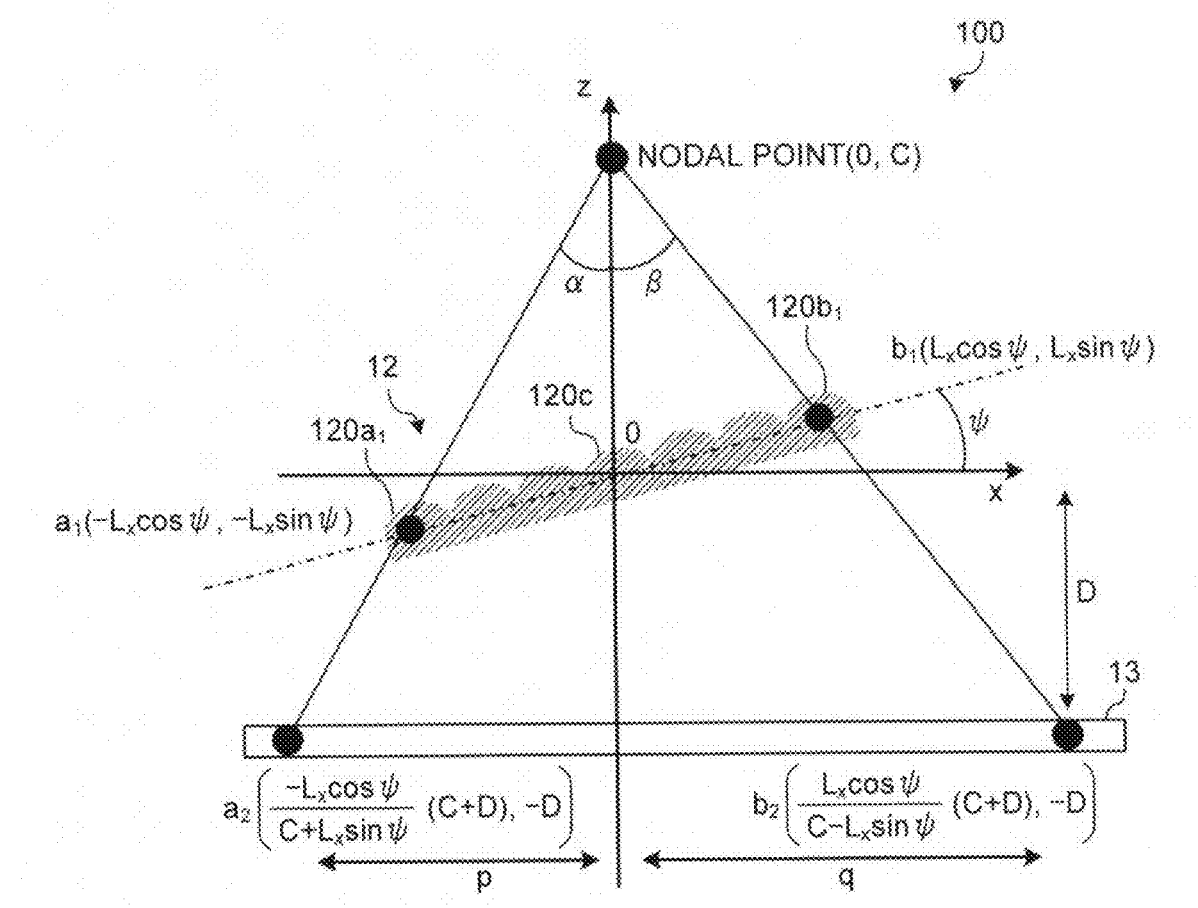
FIG. 11 is a diagram illustrating an example, according to the first embodiment, of central coordinates in the case in which the microlens array is tilted.

In FIG. 10 is illustrated an example of the central coordinates of the microlens images 30 with respect to the optical axis of the main lens 11 in the case in which the microlens array 12 is not tilted (i.e., φ=0° and ϕ=0°). In FIG. 11 is illustrated an example of the central coordinates of the microlens images 30 with respect to the optical axis of the main lens 11 in the case in which the microlens array 12 is tilted in the z-axis direction. Herein, with reference to FIGS. 10 and 11, the refractive index of the substrate of the microlens array 12 is not taken into account. Moreover, in the following explanation; it is assumed that, in the microlens array 12, the microlens 120 serving as the reference microlens has the central coordinates at the point of intersection of diagonal lines.

A portion 100 that is illustrated in (a) in FIG. 10 and that corresponds to FIG. 2 is illustrated in an enlarged manner in (b) in FIG. 10 and in FIG. 11. With reference to (b) in FIG. 10 and with reference to FIG. 11, it is assumed that the optical axis of the main lens 11 passes through a microlens 120c placed in the center of the microlens array 12 and reaches the light receiving surface of the image sensor 13.

With reference to (b) in FIG. 10, c(0, 0) represent the coordinates of the microlens 120c. Moreover, a microlens $120b_1$ that is the third right microlens from the microlens 120c has the central coordinates as $b_1(L_x, 0)$, while a microlens $120a_1$ that is the third left microlens from the microlens 120c has the central coordinates as $a_1(-L_x, 0)$. The value $L_x$ is an integral multiple of the inter-microlens distance L. In the example illustrated in (b) in FIG. 10, $L_x$=3×L is satisfied.

A nodal point (0, C) is the image forming point of the main lens 11 in the case in which the distance to the photographic subject is equal to the distance A; and represents the nodal point at which the light flux gathers after passing through the main lens 11. When seen from the nodal point (0, C), an angle α represents the angle made by the coordinates $a_1(-L_x, 0)$ with respect to the optical axis, and an angle β represents the angle made by the coordinates $b_1(L_x, 0)$ with respect to the optical axis. In this example in which the microlens array 12 is not tilted, the angle α is equal to the angle β.

In this case, the microlens image 30 that is formed on the image sensor 13 due to the microlens $120a_1$ has the central coordinates as $a_2(-(C+D)L_x/C, D)$. Similarly, the microlens image 30 formed on the image sensor 13 due to the microlens $120b_1$ has the central coordinates as $b_2((C+D)L_x/C, -D)$. Thus, a distance p from the optical axis to the microlens $120a_1$ is equal to a distance q from the optical axis to the microlens $120b_1$. Moreover, distances r between the microlens images 30, which are formed due to the microlenses 120, are also identical.

However, as illustrated in FIG. 11, when the microlens array 12 is tilted by the angle φ, the distance q from the optical axis to the microlens $120b_1$ becomes greater than the distance p from the optical axis to the microlens $120a_1$. Hence, the distances r between the microlens images 30, which are formed on the image sensor 13 due to the microlenses 120, are different on the left side of the optical axis than on the right side of the optical axis.

When the microlens array 12 is not tilted, the coordinates of the microlens $120a_1$ and the coordinates of the microlens $120b_1$ projected on the plane of the microlens array 12 are $a_1(-L_x \cos \phi, -L_x \sin \phi)$ and $b_1(L_x \cos \phi, L_x \sin \phi)$, respectively. Moreover, the microlens image 30 formed due to the microlens $120a_1$ has the central coordinates as $a_2((-L_x \cos \phi \times (C+D)/(C+L_x \sin \phi), D)$, and the microlens image 30 formed due to the microlens $120b_1$ has the central coordinates as $b_2((L_x \cos \phi \times (C+D)/(C-L_x \sin \phi), -D)$.

Herein, the explanation is given with reference to the example illustrated in FIG. 2. However, in the case of the optical system illustrated in FIG. 4, the same calculations are performed using the principle point in a main lens image instead of using the nodal point.

As described till now, in order to generate the central coordinates of the microlens images 30 formed on the image sensor 13 due to the microlenses 120, the coordinates of the reference microlens image $30_0$ and various parameters, such as the tilt of the microlens array 12, need to be obtained in an accurate manner. In the microlens images 30 used in the refocussing operation; a detection error may occur in image matching due to the effect of image distortion as explained with reference to FIGS. 6 and 7. For that reason, in the first embodiment, in the microlens array 12, the state detector is disposed that is capable of detecting the state (the three-dimensional position and the tilt) of the microlens array 12.

Figure 12:
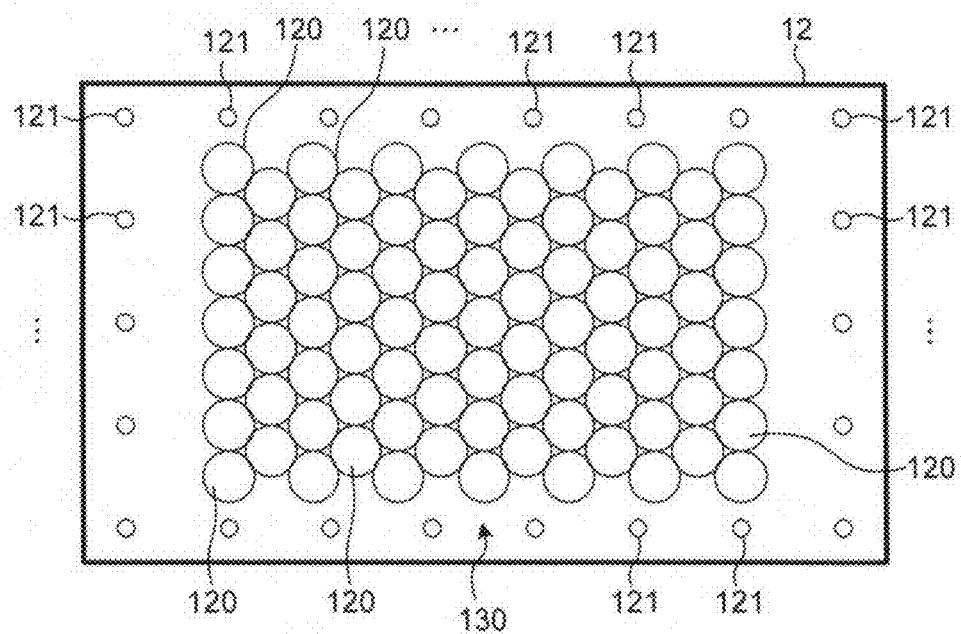
FIG. 12 is a diagram illustrating an exemplary configuration according to the first embodiment of the microlens array in which a state detector is disposed.

In FIG. 12 is illustrated an exemplary configuration according to the first embodiment of the microlens array 12 in which the state detector is disposed. With reference to FIG. 12, the microlenses 120 are disposed within a predetermined range from the center of the microlens array 12. The area in which the microlenses 120 are disposed is called an imaging microlens area 130.

Moreover, in the first embodiment, in the microlens array 12, a state detection area for enabling detection of the state of the microlens array 12 is provided on the periphery of the imaging microlens area 130. In the first embodiment, in the state detection area, state detection microlenses 121 are disposed at positions which are on the outside of the imaging microlens area 130 and at which the light coming from the main lens 11 falls on the image sensor 13 after passing through the state detection microlenses 121.

The area on the periphery of the microlens array 12 is far away from the optical axis of the main lens 11 and has a greater image height. That is, in the first embodiment, the area which has a greater image height and in which the image quality deteriorates due to shading of the main lens 11 is used as the state detection area for the microlens array 12.

In this way, according to the first embodiment, the area having a greater image height is used as the state detection area, and the area closer to the optical axis of the main lens 11 and having a smaller image height is used during the refocussing operation to obtain the microlens images 30 for the image reconfiguration purpose. For that reason, the parameters used in obtaining the correction coefficient, which is used in correcting the central coordinates of the microlens images 30, can be detected with high accuracy while blocking any effect on the reconstructed image.

Since the state detection microlenses 121 are disposed in the area having a greater image height, the respective images formed on the image sensor 13 become distorted. Hence, it is desirable that the state detection microlenses 121 are formed in such a way that point images are formed on the image sensor 13.

Figure 13:
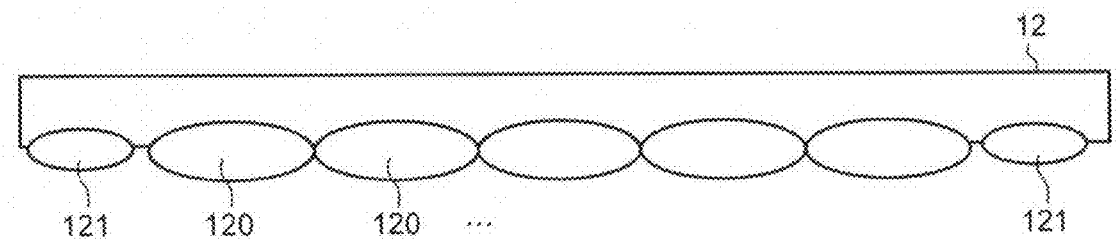
FIG. 13 is a diagram illustrating an example, according to the first embodiment, of a case in which state detection microlenses are disposed on the same surface on which the microlenses are disposed.
Figure 14:
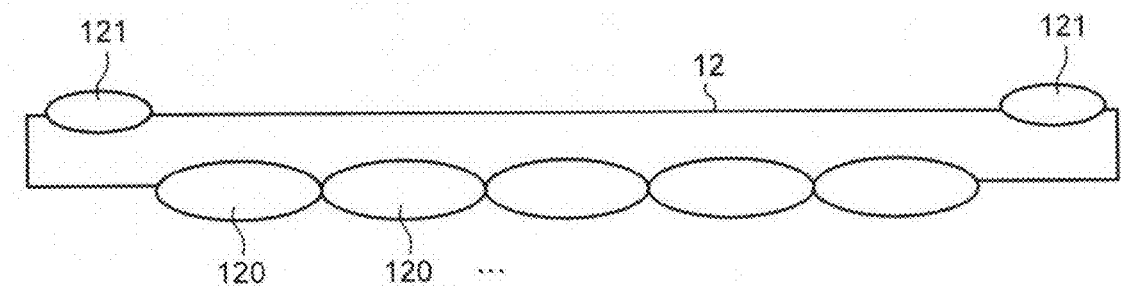
FIG. 14 is a diagram illustrating an example, according to the first embodiment, of a case in which the state detection microlenses are disposed on a different surface than the surface on which the microlenses are disposed.

Meanwhile, in the microlens array 12, as illustrated in FIG. 13, the state detection microlenses 121 can be disposed on the same surface on which the microlenses 120 are disposed. However, that is not the only possible case. Alternatively, in the microlens array 12, as illustrated in FIG. 14, the state detection microlenses 121 can be disposed on the opposite surface to the surface on which the microlenses 120 are disposed.

Figure 15:
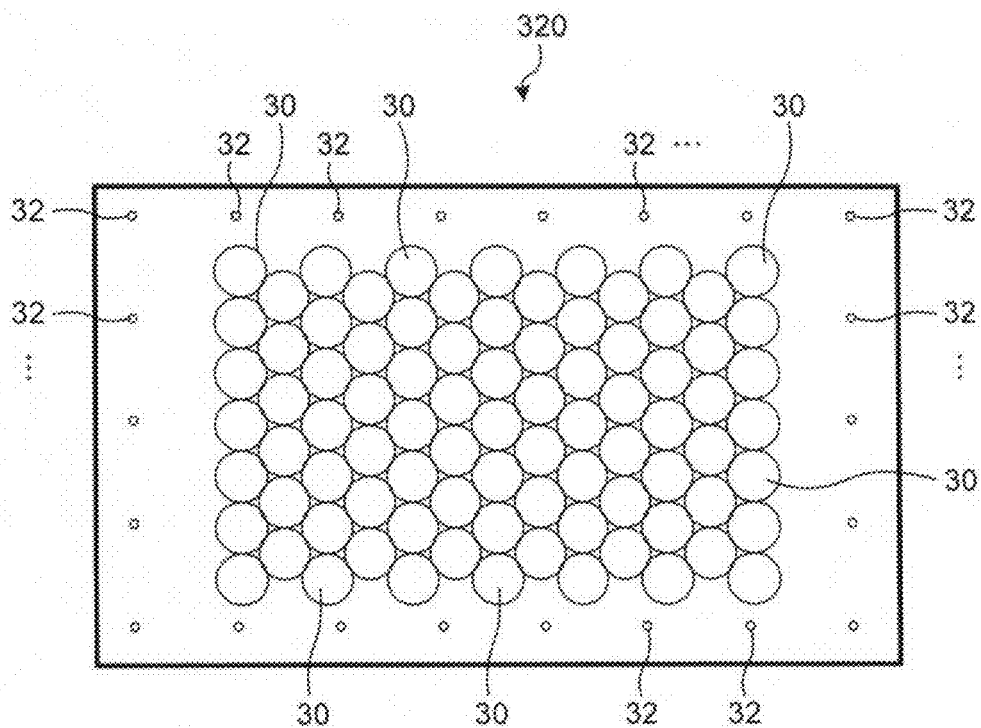
FIG. 15 is a diagram illustrating exemplary images according to the first embodiment that are formed on an image sensor due to the microlens array in which the state detection microlenses are disposed.

In FIG. 15 are illustrated exemplary images according to the first embodiment that are formed on the image sensor 13 due to the microlens array 12 in which the state detection microlenses 121 are disposed. As illustrated in FIG. 15, according to the output of the image sensor 13, a RAW image 320 is obtained in which state detection microlens images 32 in the form of point images are arranged on the periphery of the microlens images 30 used in imaging.

Operation for Generating Group of Central Coordinates of Microlens Images

Figure 16:
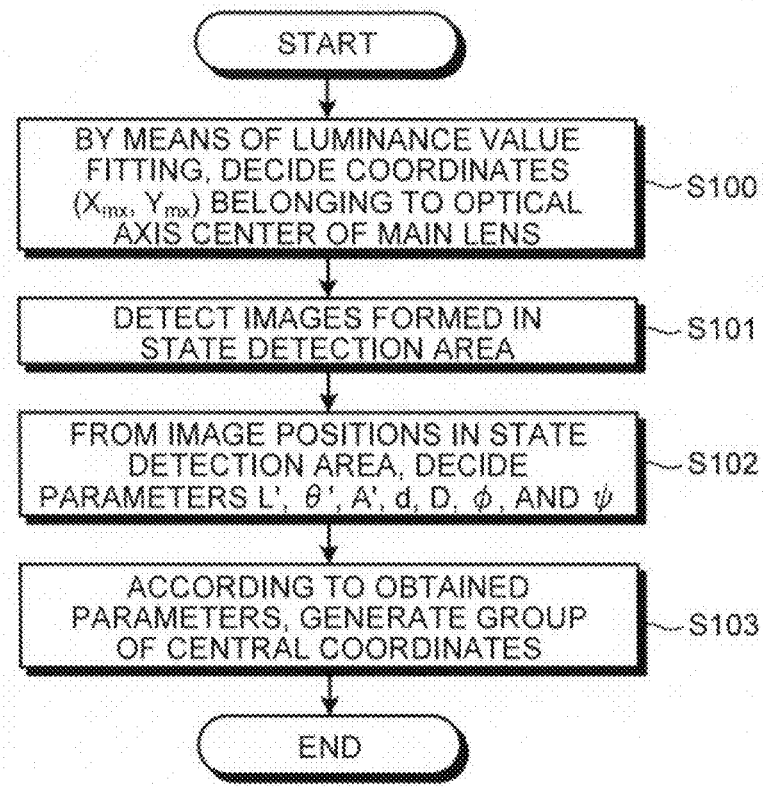
FIG. 16 is a flowchart for explaining an example of the operation of generating a group of central coordinates of the microlens images according to the first embodiment.

Given below is the explanation of an example of the operation for generating the group of central coordinates of the microlens images 30 according to the first embodiment. FIG. 16 is a flowchart for explaining an example of the operation of generating the group of central coordinates of the microlens images according to the first embodiment. The operations illustrated in the flowchart in FIG. 16 are performed by the correction processor 25 of the ISP 20. Meanwhile, prior to the start of the operations illustrated in the flowchart in FIG. 16, it is assumed that a RAW image, which is obtained when the light coming from the microlens array 12 falls on the image sensor 13, is output from the camera module 10 to the ISP 20 and stored in the memory 22.

Figure 17:
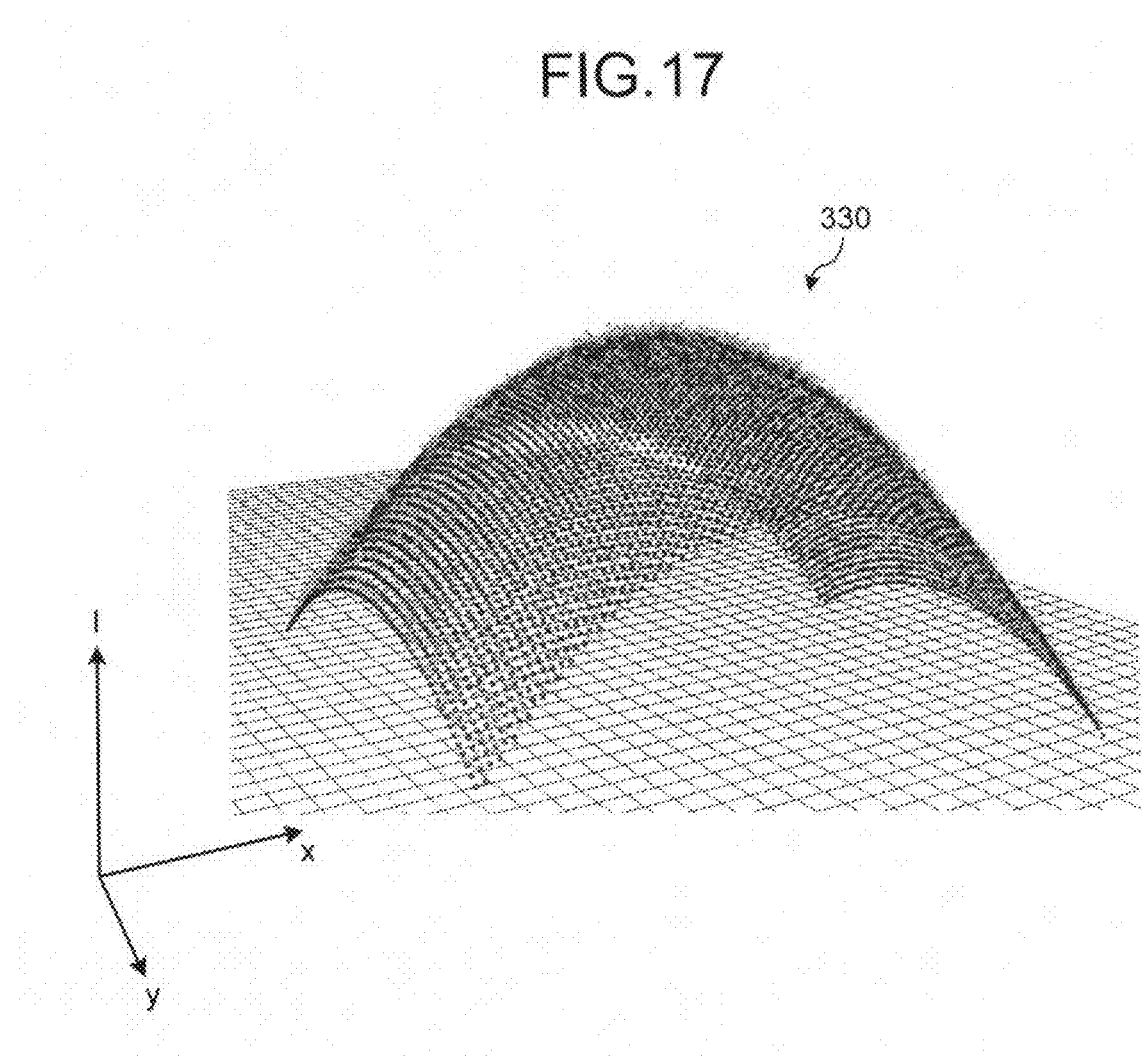
FIG. 17 is a diagram for explaining about the extraction of the luminance value of the apex of a luminance value curve of each microlens image according to the first embodiment.

The correction processor 25 decides, by means of luminance value fitting, coordinates $(X_{mx}, Y_{mx})$ that are present in the RAW image 320 and that belong to the optical axis center of the main lens 11 (Step S100). More particularly, from the luminance values of the pixels present in the RAW image 320 that is stored in the memory 22, the correction processor 25 extracts the luminance value of the apex of a luminance value curve of each microlens image 30. Then, as illustrated in FIG. 17, with respect to a luminance value 330 of the apex in each microlens image 30, a fitting operation is performed using a polynomial curved surface and the coordinates of the peak luminance value are calculated. The calculated coordinates are the coordinates $(X_{mx}, Y_{mx})$ of the optical axis center of the main lens 11. Meanwhile, as the coordinates, it is possible to use, for example, a value indicating the pixel position in the RAW image 320.

Herein, the fitting operation using a polynomial curved surface can be performed, for example, using Equation (4) given below. However, the mathematical expression used in the fitting operation is not limited to Equation (4). Alternatively, for example, according to the state of the RAW image 320 with respect to which the fitting operation is to be performed, the mathematical expression can be appropriately selected.

$$I(x,y) = a(x)y^3 + b(x)y^2 + c(x)y + d(x)$$

$$a(x) = Ax^3 + Bx^2 + Cx + D$$

$$b(x) = Ex^3 + Fx^2 + Gx + H$$

$$c(x) = Ix^3 + Jx^2 + Kx + L$$

$$d(x) = Mx^3 + Nx^2 + Px + Q \quad (4)$$

Subsequently, from the RAW image 320 stored in the memory 22, the correction processor 25 detects the state detection microlens images 32 formed in the state detection area and obtains the position (coordinates) of each state detection microlens image 32 (Step S101). As a result of performing the fitting operation and feature point extraction with respect to the RAW image 320, the correction processor can detect the state detection microlens images 32.

Then, as explained below, from the positions of the state detection microlens images 32, the correction processor obtains parameters L', θ', A', d, D, ϕ and φ (Step S102).

The positions of the state detection microlens images 32 extracted at Step S101 include, as parameters, values related to the state of the microlens array 12. Thus, the parameters include, for example, the difference between coordinates $(X_c, Y_c)$ of the center position of the microlens array 12 and the coordinates $(X_{mx}, Y_{mx})$ of the optical axis center of the main lens 11. Moreover, the parameters include a distance A' between the nodal point of the light flux of the main lens 11 and the front surface of the microlens array 12. Furthermore, the parameters include a thickness d of the substrate of the microlens array 12; and include the distance D from the rear surface of the microlens array 12 to the light receiving surface of the image sensor 13. Moreover, when the microlens array 12 has a tilt, the parameters include the angles ϕ and φ described above.

The correction processor 25 assumes an ideal model in which the microlens array 12 does not have any tilt (ϕ=0°, φ=0°) and in which the central coordinates of the microlens array 12 and the optical axis center of the main lens 11 are coincident with the center of the image sensor 13. Then, based on the difference between the state detection microlens images 32, which are actually formed in the RAW image 320, and the ideal model, and based on the difference between the microlens images 30, which are formed due to the microlenses 120 in the imaging microlens area 130, and the ideal model; the correction processor 25 obtains the parameters related to the state of the microlens array 12 by implementing the method of steepest descent.

Figure 18:
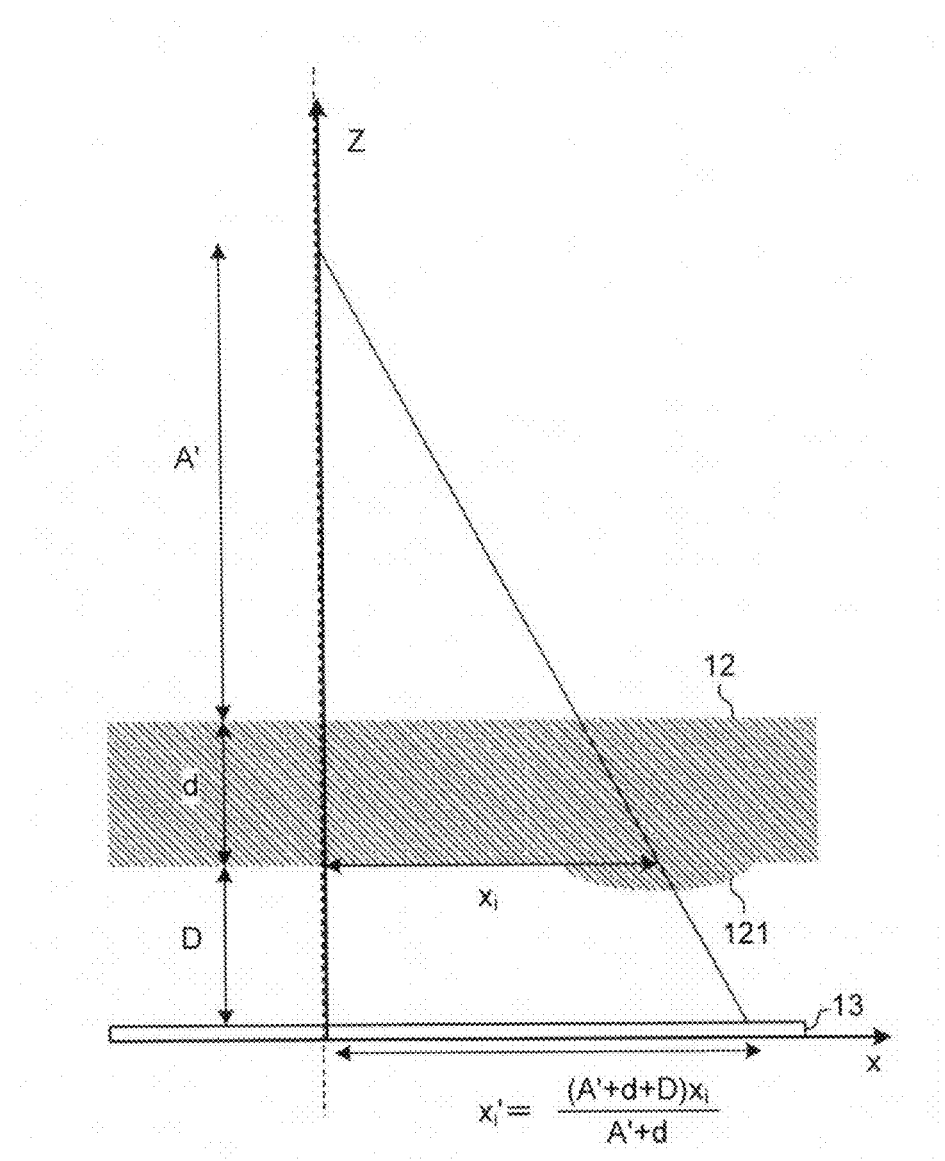
FIG. 18 is a diagram illustrating, according to the first embodiment, an exemplary image forming position of a microlens image in an ideal model.

In FIG. 18 is illustrated an exemplary image forming position $x_i'$ of a microlens image 30 in the ideal model. In the ideal model illustrated in FIG. 18, as an example of the optical system, the microlens array 12 is parallel to the light receiving surface of the image sensor 13 (ϕ=0°), and the refractive index of the substrate of the microlens array 12 is ignorable. Moreover, in the ideal model, the coordinates $(x_c, y_c)$ of the center of the substrate of the microlens array 12 are coincident with the coordinates $(X_{mx}, Y_{mx})$ of the optical axis center of the main lens 11.

According to FIG. 18, due to the microlens 120 (or the state detection microlens 121) present at the distance $x_i$ from the optical axis center of the main lens 11, an image is formed on the image sensor 13 at the position at a distance $X_i'$ given below in Equation (5). As is clear from Equation (5), when the microlenses 120 are arranged on the substrate at regular intervals, the microlens images 30 formed due to the microlenses 120 are positioned at regular intervals on the image sensor 13.

$$x_1' = \frac{(A' + d + D)x_i}{A' + d} \quad (5)$$

Figure 19:
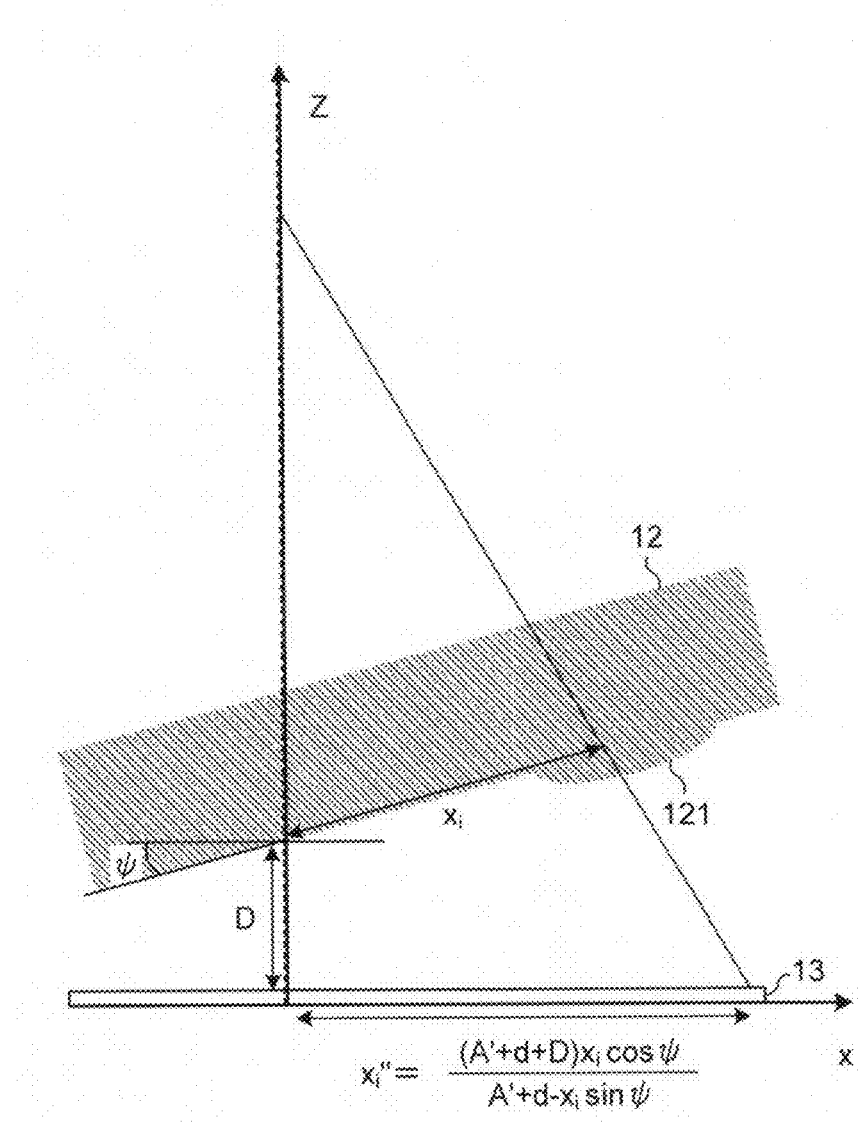
FIG. 19 is a diagram illustrating, according to the first embodiment, an exemplary image forming position of a microlens image in the case in which the microlens array is tilted.

In FIG. 19 is illustrated an exemplary image forming position $x_i''$ of a microlens image 30 in the case in which the microlens array 12 is tilted by the angle ϕ with respect to the light receiving surface of the image. According to FIG. 19, when the microlens array 12 is tilted, due to the microlens 120 (or the state detection microlens 121) present at the distance $x_i$ from the optical axis center of the main lens 11, an image is formed on the image sensor 13 at the position at a distance $x_i''$ given below in Equation (6). As is clear from Equation (6), when the microlens array 12 is tilted, even if the microlenses 120 are arranged on the substrate at regular intervals, the microlens images 30 that are formed due to the microlenses 120 are not position at regular intervals on the image sensor 13.

$$x_i'' = \frac{(A' + d + D)x_i \cos\varphi}{A' + d - x_i \sin\varphi} \quad (6)$$

As a model that can simulate the actual optical system, it is assumed that the image forming positions for all microlenses (i.e., the microlenses 120 and the state detection microlenses 121) of the microlens array 12 are expressed using Equation (6). An assessment function of the method of steepest descent is given below in Equation (7). In Equation (7), a variable $x_i$ represents the image forming positions of the state detection microlens images 32 that are detected from the RAW image 320 based on the output of the image sensor 13. Moreover, a variable $N_{ML}$ represents the number of state detection microlenses 121 disposed in the microlens array 12.

$$T = \sum_{i=0}^{N_{ML}} (x_i'' - X_i)^2 \quad (7)$$

In Equation (7), the parameters A', d, D, and ϕ for which a value T becomes the smallest are obtained using the method of steepest descent. As a result, it becomes possible to obtain the parameters A', d, D, and ϕ that are approximated to the actual optical system. Using the parameters A', d, D, and q obtained in Equation (7), it becomes possible to decide on the inter-microlens distance L' and the initial-arrangement angle θ'.

Figure 20:
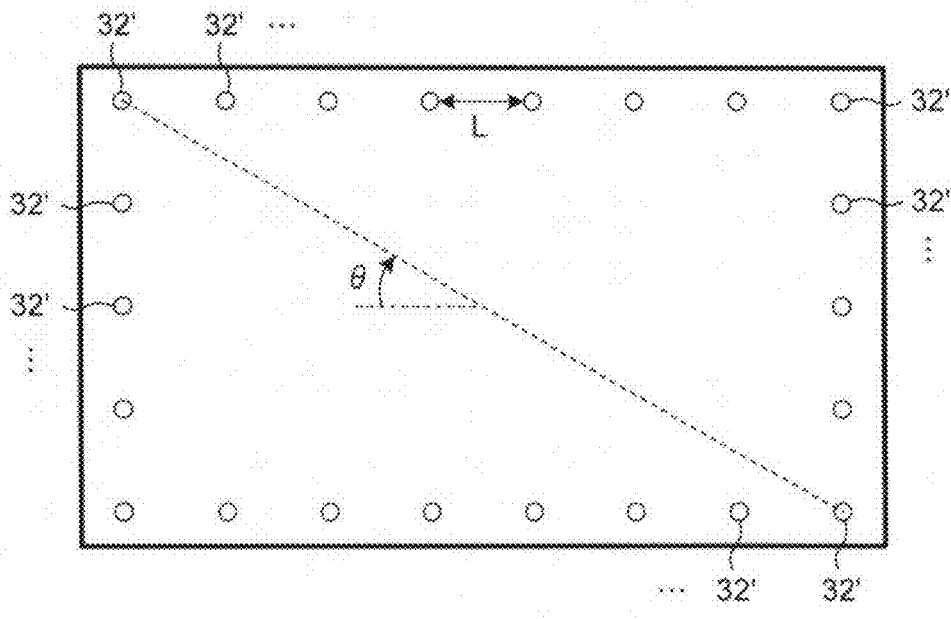
FIG. 20 is a diagram for explaining a state, according to the first embodiment, in which the tilt component of the microlens array is eliminated.

Then, each image forming position is recalculated by setting 0° as the angle ϕ, which is the tilt component of the microlens array 12 from among the parameters A', d, D, and φ obtained in Equation (7). That is, the parameters A', d and D obtained in Equation (7) are applied to Equation (5) and each image forming position $x_i$ is recalculated. As a result of the recalculation, as illustrated in FIG. 20, the image forming positions of state detection microlens images 32' are obtained in the state in which the tilt component of the microlens array 12 is eliminated.

For example, while designing the microlens array 12, the distance between the adjacent state detection microlenses 121 is set to be equal to or an integral multiple of the distance L between the microlenses 120. With that, from the recalculated distance among the state detection microlens images 32', it becomes possible to more easily obtain the distance L' between the adjacent images that are actually formed on the image sensor 13 due to the microlenses 120. For example, the ratio of the distance $x_i'$ and the distance $x_i''$ can be used as the correction coefficient, and the distance L' can be obtained based on that correction coefficient and the original distance L. Alternatively, the distance L' can be obtained using the difference between the distance $x_i'$ and the distance $x_i''$ and using the distance L.

Meanwhile, for example, the initial-arrangement angle θ of the microlenses 120 is determined in advance at the designing stage to a value based on the diagonal direction of the state detection microlenses 121. With that, the recalculated image forming positions of diagonal pairs of the state detection microlens images 32' can be used as the correction coefficients; and the initial-arrangement angle θ of each microlens image, which is actually formed on the image sensor 13, can be obtained is an easier way.

Given below is the explanation regarding coordinates $(X_n, Y_n)$ of the microlens images 30 that are actually formed on the image sensor 13 due to the microlenses 120 by taking into account the angle serving as the angle of rotation in the plane parallel to the light receiving surface of the image sensor 13. Herein, the coordinates $(X_{mx}, Y_{mx})$ of the optical axis center of the main lens 11 represent the misalignment in the axis of rotation with respect to the ideal model. In the state in which the tilt component of the microlens array is eliminated, the coordinates $(X_n, Y_n)$ can be expressed using, for example, Equation (8) given below.

$$(X_n, Y_n) = (X_{mx} + X_n \cos \phi, Y_{mx} + Y_n \sin \phi) \quad (8)$$

Based on Equation (8), using the position of each state detection microlens image 32', the correction coefficient can be obtained by implementing, for example, the same method as Equation (7), and the angle φ can be obtained based on the correction coefficient.

Returning to the explanation with reference to the flowchart illustrated in FIG. 16, according to the parameters obtained in the manner explained above, the correction processor 25 generates the group of central coordinates of the microlens images 30 in the RAW image that is actually formed on the image sensor 13 (Step S103). More particularly, the correction processor 25 generates the group of central coordinates of the microlens images 30 using the distance L' that is obtained from the parameters A', d, D, and φ; using the initial-arrangement angle θ'; using the coordinates $(X_{mx}, Y_{mx})$ of the optical axis center of the main lens 11; and using the angle of rotation φ.

Then, the correction processor 25 stores the group of central coordinates in the ROM 26. Subsequently, while performing a refocussing operation with respect to the RAW image 320 read from the memory 22, the image processor 23 applies the group of central coordinates, which is stored in the ROM 26, with respect to the RAW image 320 of each microlens image 30. As a result, during the refocussing operation, the image processor 23 can make use of the central coordinates of each microlens image 30 that are generated with high accuracy and by taking into account the tilt of the microlens array 12.

Meanwhile, the operation of generating the group of central coordinates as illustrated in the flowchart in FIG. 16 according to the first embodiment may be performed as part of the adjustment of the imaging device 1 at the time of factory shipment. However, that is not the only possible case. Alternatively, for example, in the imaging device 1, when it is possible to replace the unit such as the camera module 10, which includes the microlens array 12 and the image sensor 13; the operation of generating the group of central coordinates may be performed immediately after the unit is replaced. In that case, the operation of generating the group of central coordinates can be performed in response to a predetermined operation by the user of the imaging device 1 or can be performed automatically by the imaging device 1 upon detecting the installment of the unit.

First Modification Example of First Embodiment

Given below is the explanation of a first modification example of the first embodiment. Generally, the light coming from the photographic subject is separated into three primary colors of red (R), green (G), and blue (B) on the light receiving surface of the image sensor 13. Hence, color filters for RGB colors are disposed on a pixel-by-pixel basis. In the first modification example, in the image sensor 13, the area meant to receive the light coming from the state detection microlenses 121 is configured as an area for detecting the white color.

Figure 21:
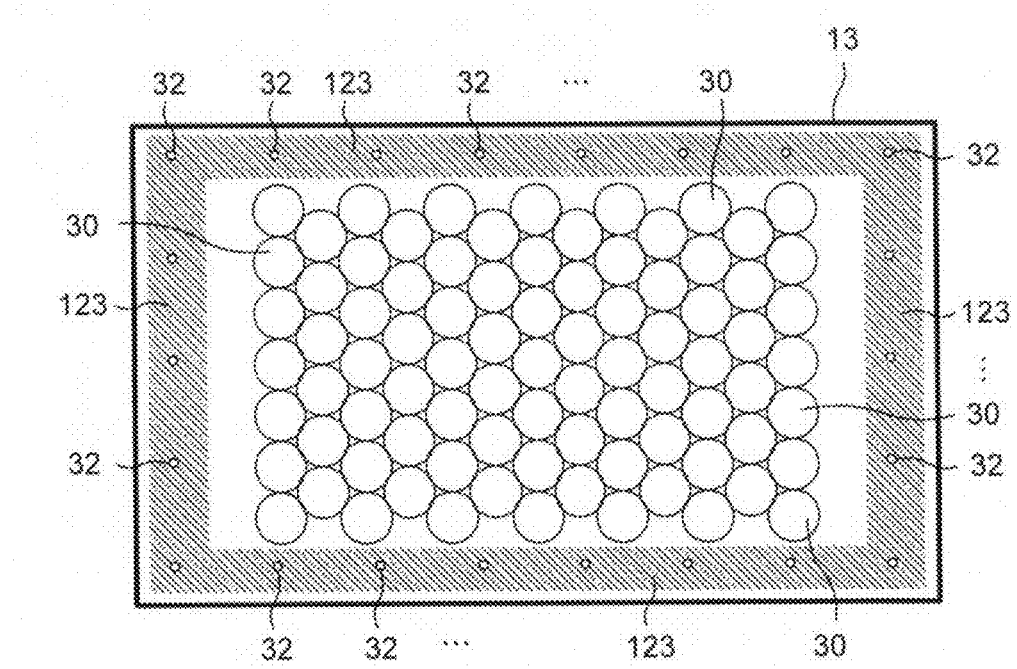
FIG. 21 is a diagram illustrating an example of a light receiving surface of the image sensor according to a first modification example of the first embodiment.

In FIG. 21 is illustrated an example according to the first modification example of the light receiving surface of the image sensor 13 and the microlens images 30 and the state detection microlens images 32 formed on the image sensor 13. In this example, in order to generate the microlens images 30 and the state detection microlens images 32, the microlens array 12 explained with reference to FIG. 12 is used.

With reference to FIG. 21, the light receiving positions of the state detection microlens images 32 and a predetermined range including those light receiving positions are configured as a white color detection area 123 for detecting the white color. For example, the white color detection area 123 can be provided by not disposing any color filter for the pixels corresponding to the white color detection area 123 of the image sensor 13.

As a result of setting the light receiving positions of the state detection microlens images 32, which are formed on the image sensor 13, as the white color detection area 123; the group of central coordinates can be generated with high accuracy even under a low-light environment.

Second Modification Example of First Embodiment

Given below is the explanation of a second modification example of the first embodiment. In the first embodiment, with the aim of detecting the state of the microlens array 12, the state detection microlenses 121 are disposed in the microlens array 12. However, that is not the only possible case. Alternatively, in the image sensor 13, if it is possible to form predetermined images on the periphery of the area in which the microlens images 30 are formed; then it is possible to have some other configuration regarding the periphery of the imaging microlens area 130 in the microlens array 12.

Figure 22:
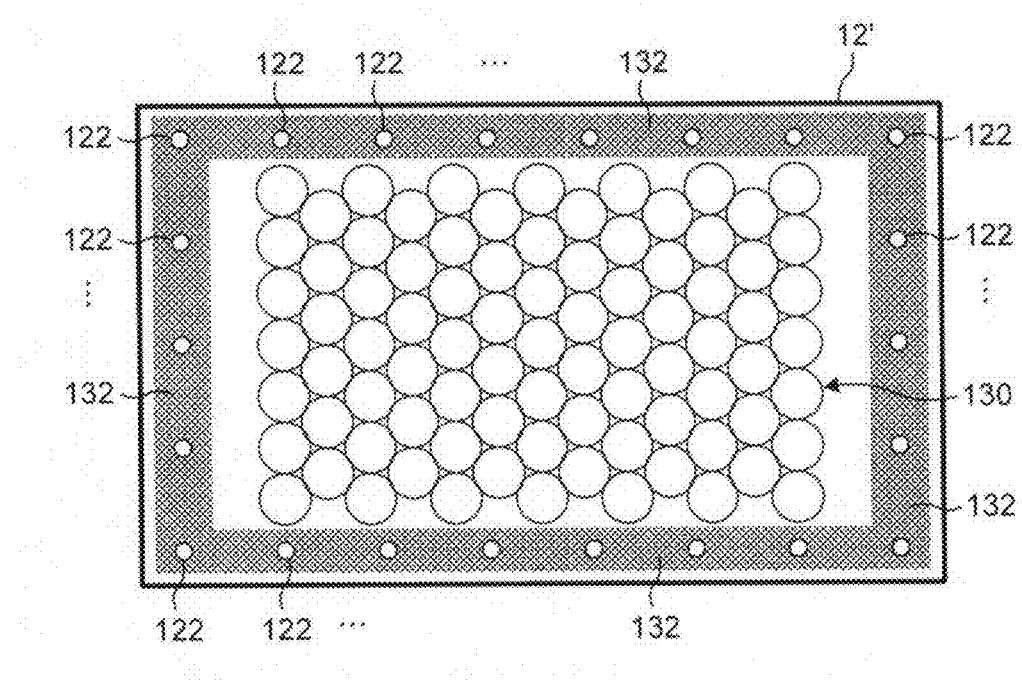
FIG. 22 is a diagram illustrating an exemplary configuration of the microlens array according to a second modification example of the first embodiment.

In FIG. 22 is illustrated an exemplary configuration of a microlens array 12' according to the second modification example. As illustrated in FIG. 22, in the second modification example, on the periphery of the imaging microlens area 130, apertures 122 are disposed in place of the state detection microlenses 121. The apertures 122 are configured in such a way that the images formed on the image sensor 13 due to the light passing through the apertures 122 have a smaller diameter than the diameter of the microlenses 120. Moreover, the area in which the apertures 122 are disposed is configured as a light shielding area 132 for blocking out the light by means of vapor deposition, plating, or coating.

In this way, by forming the apertures 122 having an appropriately-designed inner diameter on the periphery of the imaging microlens area 130, predetermined images equivalent to the state detection microlens images 32 can be formed on the periphery of the area of the image sensor 13 in which the microlens images 30 are formed. Based on the images formed due to the apertures 122, the correction processor 25 performs the operations illustrated in the flowchart in FIG. 16.

Besides, as a result of using the apertures 122 for detecting the state of the microlens array 12, it becomes possible to reduce the cost of the microlens array 12 as compared to the case in which the state detection microlenses 121 are used.

Third Modification Example of First Embodiment

Figure 23:
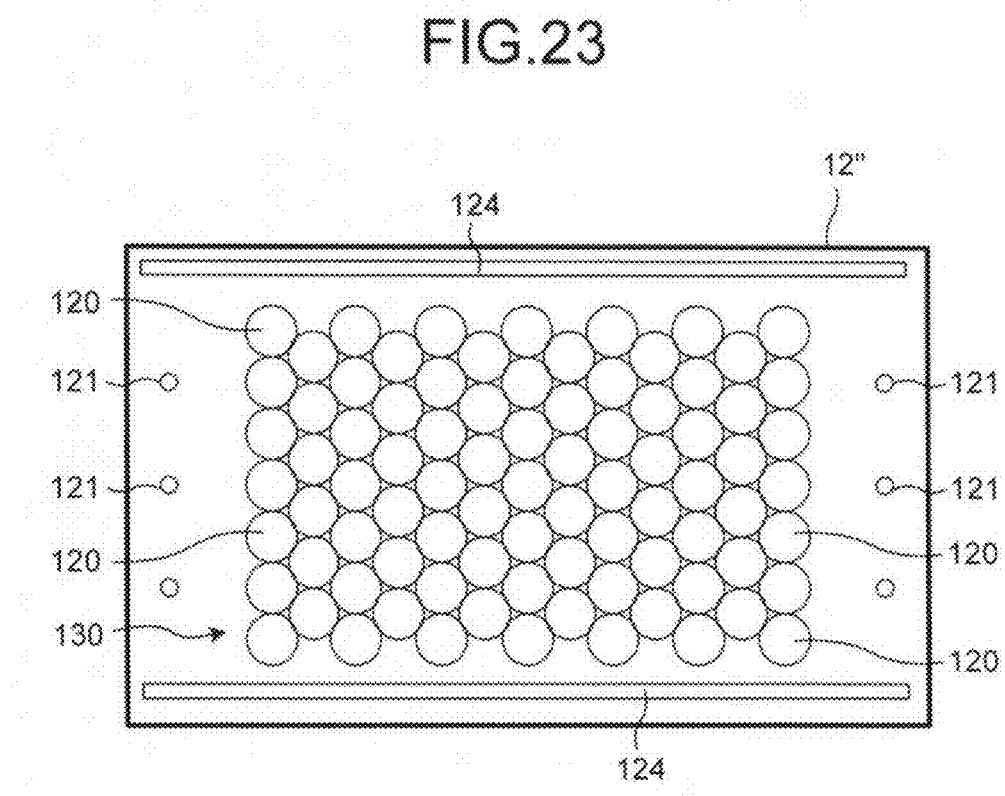
FIG. 23 is a diagram illustrating an exemplary configuration of the microlens array according to a third modification example of the first embodiment.

Given below is the explanation of a third modification example of the first embodiment. In FIG. 23 is illustrated an exemplary configuration of a microlens array 12" according to the third modification example. As illustrated in FIG. 23, in the third modification example, the microlens array 12" is configured by replacing some of the state detection microlenses 121 with linear lenticular lenses 124. In the example illustrated in FIG. 23, the lenticular lenses 124 are disposed parallel to the long-side periphery of the imaging microlens area 130. Moreover, the lenticular lenses 124 are configured to have the short-side width shorter than the diameter of the microlenses 120.

According to the configuration illustrated in FIG. 23, in the ideal model, the lenticular lenses 124 form images of straight lines on the image sensor 13. Based on the difference between the images formed in the ideal model due to the lenticular lenses 124 and the images that are actually formed on the image sensor 13 due to the lenticular lenses 124, the correction processor 25 decides the correction coefficient to be used in obtaining the group of central coordinates.

Second Embodiment

Given below is the explanation of a second embodiment. In the second embodiment, an example is given in which the optical refraction in the substrate of the microlens array 12 is taken into account unlike the configuration according to the first embodiment. That is, the principal ray passing through each microlens 120 gets refracted according to the refractive index of the microlens array substrate on which the microlens array 12 is configured. For that reason, the microlens images 30 go on shifting positions at regular intervals depending on the distance from the optical axis of the main lens 11. Hence, in reality, in contrast to the coordinates calculated using the parameters mentioned above, the central coordinates of the microlens images 30 are obtained upon performing correction using a correction coefficient obtained by a polynomial expression dependent on the distance from the optical axis of the main lens 11.

In the second embodiment, it is possible to adopt the same configuration of the imaging device 1 as the configuration explained with reference to FIG. 1 according to the first embodiment. Hence, the detailed explanation of that configuration is not repeated.

Given below with reference to FIG. 24 is concrete explanation of the action of the optical refraction in the substrate of the microlens array 12. In the case in which a refractive index n of the substrate of the microlens array 12 is ignored, it is assumed that the light coming from a nodal point $z_0$ due to the main lens 11 passes through microlenses $120_0$, $120_1$, $120_2$, and $120_3$ and falls on positions $x_0$, $x_1$, $x_2$, and $x_3$ respectively, on the image sensor 13.

In reality, since the substrate of the microlens array 12 has the predetermined refractive index n, the light falling on the microlens array 12 with an angle of incidence exceeding 0° undergoes a change in the travelling direction inside the microlens array 12 according to the refractive index n. That is, of the microlenses $120_0$, $120_1$, $120_2$, and $120_3$, except for the microlens $120_0$ having the angle of incidence substantially equal to 0°; light paths $50_1$, $50_2$, and $50_3$ coming out from the microlenses $120_1$, $120_2$, and $120_3$, respectively, change the direction toward the inside (toward the optical axis of the main lens 11) as compared to the light paths in the case in which the refractive index n is not taken into account.

Thus, as compared to the irradiation positions $x_1$, $x_2$, and $x_3$ in the case in which the refractive index n is not taken into account; the light coming out from the microlenses $120_1$, $120_2$, and $120_3$ shifts toward the position $x_0$ by a difference of $\Delta x_1$, $\Delta x_2$, and $\Delta x_3$, respectively, before falling on the image sensor 13. These differences $\Delta x_1$, $\Delta x_2$, and $\Delta x_3$ can be expressed by a polynomial expression (for example, a tertiary method) related to a position x in the image sensor 13 and having the angle of incidence of 0° as the point of origin. This polynomial expression related to the position x serves as the correction coefficient against the dependency on the image height. In the following explanation, the polynomial expression related to the position x is expressed as a function $f(x)$.

FIG. 25 is a flowchart for explaining an example of the operation of generating the group of central coordinates of microlens images according to the second embodiment. In an identical manner to the operations explained with reference to FIG. 16, the operations illustrated in the flowchart in FIG. 25 are performed by the correction processor 25 of the ISP 20. Meanwhile, prior to the start of the operations illustrated in the flowchart in FIG. 25, it is assumed that the RAW image 320, which is obtained when the light coming from the microlens array 12 falls on the image sensor 13, is output from the camera module 10 to the ISP 20 and stored in the memory 22.

In the flowchart illustrated in FIG. 25, the operations from Step S200 to S202 are identical to the operations from Step S100 to Step S102 illustrated in the flowchart in FIG. 16. That is, the correction processor 25 decides, by means of luminance value fitting, the coordinates $X_{mx}$, $Y_{mx}$) that are present in the RAW image 320 and that belong to the optical axis center of the main lens 11 (Step S200). Then, from the RAW image 320 stored in the memory 22, the correction processor 25 detects the state detection microlens images 32 and obtains the position (coordinates) of each state detection microlens image 32 (Step S201). Subsequently, as explained above, from the positions of the state detection microlens images 32, the correction processor 25 obtains the parameters L', θ', A', d, D, φ and ϕ based on Equation (5) to Equation (8) (Step S202). Then, according to Step S103 illustrated in FIG. 16, the correction processor 25 generates the group of central coordinates of the microlens images 30.

Subsequently, the correction processor 25 decides the correction coefficient against the dependency on image height (Step S203). That is, at Step S203, in the case in which the known refractive index n of the substrate is taken into account, the correction processor 25 obtains the correction coefficient at each position in the substrate of the microlens array 12.

More particularly, in the area having a relatively smaller image height, such as in the imaging microlens area 130; the correction processor 25 obtains, from the RAW image 320, the positions on the image sensor 13 of the central coordinates of the microlens images 30 of the microlenses 120 disposed within a predetermined range from the center of the concerned area. In this way, the microlens images 30 formed in the area having a relatively smaller image height can be expected to have less image distortion as compared to the microlens images formed in the area having a greater image height. For that reason, even if the microlens images 30 are not point images like the state detection microlens images 32, it is believed that the central coordinates can be obtained with high accuracy.

Then, based on the difference between the group of central coordinates of the microlens images 30, which are generated according to the parameters L', θ', A', d, D, φ and ϕ generated at Step S202, and the group of central coordinates obtained from the RAW image 320; the correction processor 25 obtains the function f(x) that represents the correction coefficient against the dependency on image height.

Subsequently, the correction processor 25 uses the correction coefficient obtained at Step S203, and corrects the central coordinates of each microlens image 30 that are included in the group of central coordinates generated at Step S202 (Step S204).

Then, the correction processor 25 stores the group of corrected central coordinates in the ROM 26. Thus, the image processor 23 can make use of the central coordinates of each microlens image 30 that are less affected by the dependency on image height and by taking into account the tilt of the microlens array 12, and can perform a refocussing operation with more accuracy.

Third Embodiment

In the description given above, the correction processor is built into the imaging device 1. However, that is not the only possible case. In a third embodiment, the explanation is given for an example in which the correction processor 25 is configured as an external device with respect to the imaging device 1. In this case, the correction processor 25 can be configured using a dedicated hardware, or can be configured as a central-coordinates group generating program that runs in a general-purpose information processing device such as a computer.

When the correction processor 25 is configured as a central-coordinates group generating program, it can be stored in a storage medium such as a compact disk (CD) or a digital versatile disk (DVD), or can be provided via a network such as the Internet. When the central-coordinates group generating program is supplied to an information processing device, it gets stored in a storage device such as a hard disk drive or a nonvolatile memory of the information processing device according to a predetermined procedure, and gets installed in the information processing device. Then, a central processing unit (CPU) reads the central-coordinates group generating program from the storage device, loads it into a main memory device such as a random access memory (RAM), and executes it.

In the imaging device 1, the RAW image 320 including the state detection microlens images 32 is read from the memory 22; and sent to the information processing device, in which the central-coordinates group generating program is installed, via a detachably attachable nonvolatile memory or a data I/F (not illustrated). Then, in the information processing device, the central-coordinates group generating program is executed. As a result, based on the RAW image 320 that is received, an operation for generating the group of central coordinates is performed according to the flowchart illustrated in FIG. 16 or the flowchart illustrated in FIG. 25. Then, the generated group of central coordinates is sent back to the imaging device 1 via a detachably attachable nonvolatile memory or a data I/F (not illustrated), and is stored in the ROM 26.

In this way, if the correction processor 25 is configured as an external device of the imaging device 1, it becomes possible to simplify the configuration of the imaging device 1 and, for example, to reduce the cost of the imaging device 1.

Modification Example of Third Embodiment

Given below is the explanation of a modification example of the third embodiment. In the modification example, the correction processor 25 is configured in a server device connected by a network such as the Internet. In this case, the imaging device 1 can be configured to be connectable to the Internet, or can transfer the RAW image 320 taken therein to an information processing device configured to be connectable to the Internet.

The server device receives the RAW image 320 from the imaging device 1 or the information processing device via the network, and performs an operation for generating the group of central coordinates according to the flowchart illustrated in FIG. 16 or the flowchart illustrated in FIG. 25. Then, the server device sends the generated group of central coordinates to the imaging device 1 or the information processing device via the network.

In this way, if the correction processor 25 is configured in a server device connected to a network such as the Internet, it becomes possible to simplify the configuration of the imaging device 1 and, for example, to reduce the cost of the imaging device 1. Besides, it also becomes possible to save the effort of installing the central-coordinates group generating program in an information processing device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging device, comprising:
a plurality of microlenses disposed in an imaging microlens area and configured to form two-dimensional images;
a state detector disposed on a periphery of the imaging microlens area and configured to, on an image forming surface of the microlenses, generate images having a smaller diameter than images formed by the microlenses; and
a main lens configured to guide light coming from a subject to a solid-state image sensing device, wherein a microlens array is disposed between the main lens and an image sensor, and the state detector is disposed apart from the microlens array,
the image sensor configured to receive light coming from the microlens array, convert the received light into an electrical signal on a pixel-by-pixel basis, and output the electrical signals; and
a corrector that calculates, using an image coming from the state detector, a correction coefficient to be used in correcting central coordinates of each of the plurality of microlenses.

2. The imaging device according to claim 1, wherein the state detector includes a microlens.

3. The imaging device according to claim 1, wherein the state detector includes a lenticular lens.

4. The imaging device according to claim 1, wherein the state detector includes an aperture.

5. The imaging device according to claim 1, wherein the image sensor includes no color filter for pixels in an area of the microlens array which receives light coming from the state detector.

6. The imaging device according to claim 1, wherein the corrector obtains, based on an output of the image sensor, a center position of an optical axis with respect to the imaging microlens area and a light receiving position in the image sensor at which light from the state detector is received, and corrects position information of each of the plurality of microlenses in the image sensor based on a difference between the obtained center position and a center position in an ideal model, and a difference between the obtained light received position and a light received position in the ideal model.

7. The imaging device according to claim 6, wherein the corrector obtains, based on a light reception output from the imaging microlens area, a correction coefficient against dependency on image height of the image sensor, and corrects position information of each of the plurality of microlenses in the image sensor based on the differences and the correction coefficient.

* * * * *